US011765663B2

(12) United States Patent
Ryu et al.

(10) Patent No.: US 11,765,663 B2
(45) Date of Patent: Sep. 19, 2023

(54) METHOD AND DEVICE FOR CONTROLLING TRANSMISSION POWER IN WIRELESS COMMUNICATION SYSTEM

(71) Applicant: Samsung Electronics Co., Ltd., Gyeonggi-do (KR)

(72) Inventors: Hyunseok Ryu, Gyeonggi-do (KR); Sungjin Park, Gyeonggi-do (KR); Jeongho Yeo, Gyeonggi-do (KR); Jinyoung Oh, Gyeonggi-do (KR)

(73) Assignee: Samsung Electronics Co., Ltd

( * ) Notice: Subject to any disclaimer, the term of this patent is extended or adjusted under 35 U.S.C. 154(b) by 367 days.

(21) Appl. No.: 17/278,856

(22) PCT Filed: Aug. 30, 2019

(86) PCT No.: PCT/KR2019/011153
§ 371 (c)(1),
(2) Date: Mar. 23, 2021

(87) PCT Pub. No.: WO2020/067653
PCT Pub. Date: Apr. 2, 2020

(65) Prior Publication Data
US 2022/0039021 A1 Feb. 3, 2022

(30) Foreign Application Priority Data
Sep. 27, 2018 (KR) .................. 10-2018-0115349

(51) Int. Cl.
*H04W 52/08* (2009.01)
*H04W 24/10* (2009.01)
(Continued)

(52) U.S. Cl.
CPC .......... *H04W 52/08* (2013.01); *H04W 24/10* (2013.01); *H04W 52/14* (2013.01); *H04W 52/242* (2013.01)

(58) Field of Classification Search
CPC ....... H04W 52/38; H04W 4/40; H04W 76/14; H04W 52/32; H04W 52/34; H04W 52/10; H04W 52/08; H04W 52/06
See application file for complete search history.

(56) References Cited

U.S. PATENT DOCUMENTS 8,369,800 B2  2/2013 Li et al.
8,929,281 B2  1/2015 Li et al.
(Continued)

FOREIGN PATENT DOCUMENTS

EP        2 465 324       3/2016
KR      1020140138616    12/2014
(Continued)

OTHER PUBLICATIONS

Korean Office Action dated Aug. 3, 2022 issued in counterpart application No. 10-2018-0115349, 10 pages.
(Continued)

*Primary Examiner* — Tu X Nguyen
(74) *Attorney, Agent, or Firm* — The Farrell Law Firm, P.C.

(57) ABSTRACT

The present disclosure provides a method, performed by a sidelink user equipment (UE), of controlling a transmission power in a wireless communication system, the method including: obtaining, by a first sidelink UE, control information for determining whether to perform a closed loop power control (CLPC) process; transmitting a sidelink measurement signal to a second sidelink UE based on a result of the determining; receiving a sidelink signal transmitted according to a transmission power value set based on the sidelink measurement signal; and providing transmission power control (TPC) command information based on a transmission power value of the received sidelink signal.

15 Claims, 12 Drawing Sheets

(51) Int. Cl.
  *H04W 52/14* (2009.01)
  *H04W 52/24* (2009.01)

(56) References Cited

U.S. PATENT DOCUMENTS

| | | |
|---|---|---|
| 9,967,069 B2 | 5/2018 | Park et al. |
| 2018/0139706 A1* | 5/2018 | Li .................. H04W 72/542 |
| 2018/0146433 A1 | 5/2018 | Zhang et al. |
| 2018/0206176 A1 | 7/2018 | Panteleev et al. |
| 2019/0253982 A1 | 8/2019 | Lee et al. |
| 2019/0274054 A1* | 9/2019 | Salem .................. H04L 12/189 |
| 2020/0112400 A1* | 4/2020 | Lee .................. H04L 5/0055 |
| 2020/0336997 A1 | 10/2020 | Zhang et al. |

FOREIGN PATENT DOCUMENTS

| | | |
|---|---|---|
| KR | 1020170109229 | 9/2017 |
| KR | 1020180063265 | 6/2018 |
| WO | WO 03/028229 | 4/2003 |
| WO | WO 2018/027231 | 2/2018 |

OTHER PUBLICATIONS

Huawei, HiSilicon, "Discussion on Sidelink Power Control", R1-1707036, 3GPP TSG RAN1 Meeting #89, May 15-19, 2017, 3 pages.
Korean Office Action dated Feb. 21, 2022 issued in counterpart application No. 10-2018-0115349, 11 pages.
International Search Report dated Dec. 12, 2019 issued in counterpart application No. PCT/KR2019/011153, 20 pages.

\* cited by examiner

FIG. 2
A. UNICAST V2X COMMUNICATION
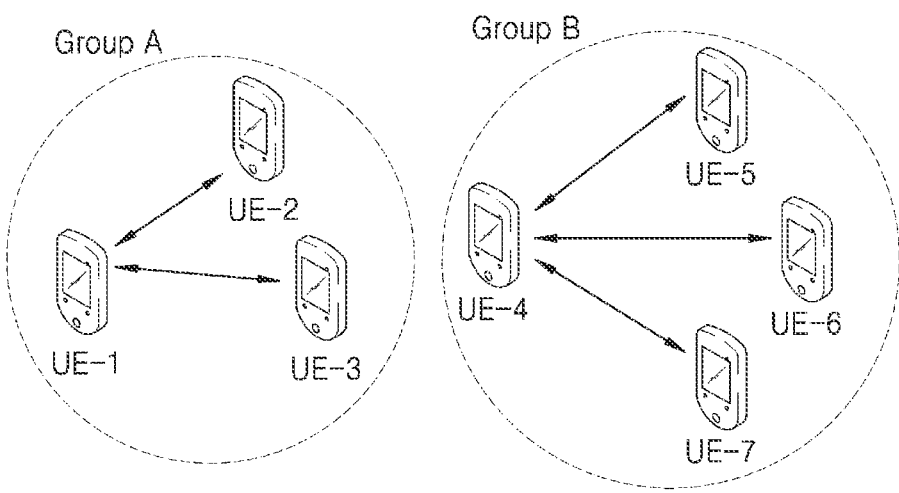
B. GROUPCAST V2X COMMUNICATION

METHOD AND DEVICE FOR CONTROLLING TRANSMISSION POWER IN WIRELESS COMMUNICATION SYSTEM

PRIORITY

This application is a National Phase Entry of PCT International Application No. PCT/KR2019/011153, which was filed on Aug. 30, 2019, and claims priority to Korean Patent Application No. 10-2018-0115349, which was filed on Sep. 27, 2018, the entire content of each of which is incorporated herein by reference.

TECHNICAL FIELD

The present disclosure relates to a method and a device for controlling transmission power for communication between user equipments (UEs).

BACKGROUND ART

Efforts have been made to develop an improved $5^{th}$ generation (5G) communication system or pre-5G communication system to keep up with growing wireless data traffic demand after the commercialization of $4^{th}$ generation (4G) communication systems. For this reason, the 5G or pre-5G communication system is called a beyond 4G network communication system or a post long-term evolution (LTE) system. Implementation of 5G communication systems in an ultra-high frequency (millimeter-wave (mmWave)) band (such as a 60-GHz band) is under consideration to achieve high data transfer rates. To mitigate path loss of radio waves and increase transmission distance of radio waves in an ultra-high frequency band for 5G communication systems, various technologies such as beamforming, massive multiple-input multiple-output (massive MIMO), full dimensional MIMO (FD-MIMO), array antennas, analog beamforming, and large-scale antennas are being studied. Furthermore, to improve system networks for 5G communication systems, various technologies including evolved small cells, advanced small cells, cloud radio access network (Cloud-RAN), ultra-dense networks, device to device (D2D) communication, wireless backhaul, moving networks, cooperative communication, coordinated multi-points (CoMP), and interference cancellation are currently being developed. In addition, for 5G systems, advanced coding modulation (ACM) schemes such as Hybrid FSK and QAM Modulation (FQAM) and Sliding Window Superposition Coding (SWSC) and advanced access techniques such as Filter Bank Multicarrier (FBMC), non-orthogonal multiple access (NOMA), sparse code multiple access (SCMA), etc. are being developed.

Moreover, the Internet has evolved from a human-centered connection network, in which humans create and consume information, to an Internet of things (IoT) network in which dispersed components such as objects exchange information with one another to process the information. Internet of Everything (IoE) technology has emerged, in which the IoT technology is combined with, for example, technology for processing big data through connection with a cloud server. To implement the IoT, technologies such as a sensing technology, a wired/wireless communication and network infrastructure, a service interface technology, and a security technology are required, and thus, research has recently been conducted into technologies such as sensor networks for interconnecting objects, machine to machine (M2M) communication, and machine type communication (MTC). In an IoT environment, intelligent Internet technology services may be provided to create new values for human life by collecting and analyzing data obtained from interconnected objects. The IoT may be applied to various fields such as smart homes, smart buildings, smart cities, smart cars or connected cars, a smart grid, health care, smart home appliances, advanced medical services, etc., through convergence and integration between existing information technology (IT) and various industries.

Thus, various attempts are being made to apply a 5G communication system to the IoT network For example, 5G communication technologies, such as sensor networks, M2M communication, MTC, etc., are implemented using techniques such as beamforming, MIMO, array antennas, etc. The application of a cloud random access network (RAN) as the above-described big data processing technology is an example of convergence between the 5G and IoT technologies.

As various services may be provided due to the development of mobile communication systems and the aforementioned techniques, in particular, a method for effectively controlling a transmission power between UEs is required.

DESCRIPTION OF EMBODIMENTS

Technical Problem

The present disclosure provides a method for effectively controlling transmission power between user equipments (UEs).

Solution to Problem

The present disclosure provides a sidelink closed-loop transmission power control method and device for transmitting control information and data information between UEs in order to support high reliability and high data rates.

Advantageous Effects of Disclosure

Embodiments of the present disclosure provide a device and method capable of effectively providing a service in a mobile communication system.

BRIEF DESCRIPTION OF DRAWINGS

FIG. 2 is an example of a vehicle-to-everything (V2X) communication mode performed using sidelink, according to some embodiments of the present disclosure.

BEST MODE

Figure 1:
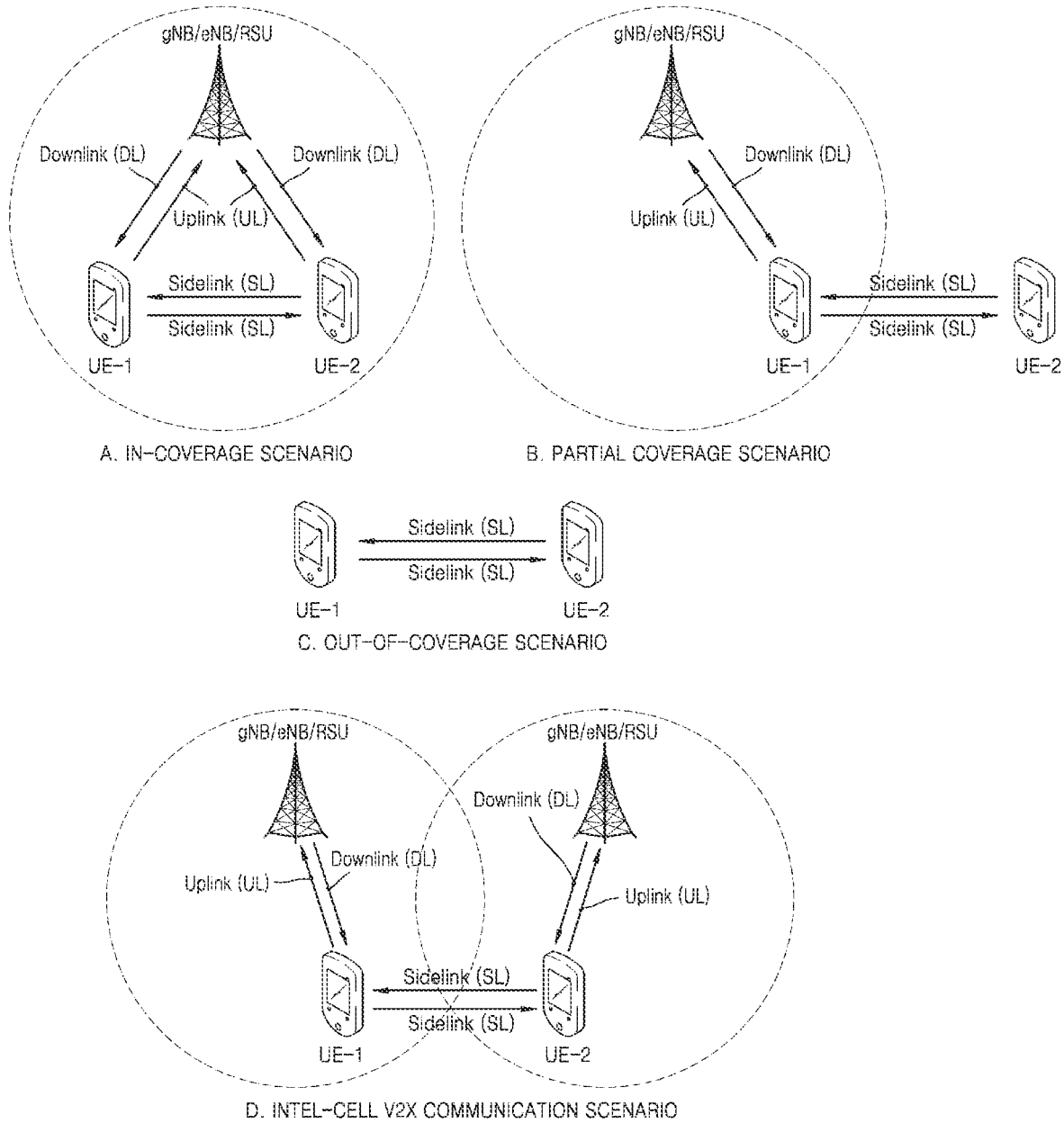
FIG. 1 illustrates an example of a system for explaining an embodiment of the present disclosure.

According to some embodiments of the present disclosure, a method, performed by a sidelink user equipment (UE), of controlling a transmission power in a wireless communication system includes: obtaining, by a first sidelink UE, control information for determining whether to perform a closed loop power control (CLPC) process; transmitting a sidelink measurement signal to a second sidelink UE based on a result of the determining; receiving a sidelink signal transmitted according to a transmission power value set based on the sidelink measurement signal; and providing transmission power control (TPC) command information based on a transmission power value of the received sidelink signal.

Whether to perform the CLPC process may be determined based on at least one of a type of communication between the first and second sidelink UEs or whether at least one of the first or second sidelink UE is located within coverage of a base station.

The type of communication between the first and second sidelink UEs may be determined based on at least one of transmission and reception resource pools allocated to at least one of the first or second sidelink UE, an open loop power control (OLPC) parameter, downlink control information (DCI), or radio resource control (RRC) signaling, the DCI and the RRC signaling being received from the base station.

The control information for determining whether to perform the CLPC process may be configured such that the CLPC process is not performed when neither the first nor the second SL UE is located within the coverage of the base station.

The obtaining of the control information for determining whether to perform the CLPC process may include obtaining the control information via RRC signaling or DCI received from the base station.

The obtaining of the control information for determining whether to perform the CLPC process may include obtaining the control information for determining whether to perform the CLPC process based on a bit field for a TPC command in the DCI received from the base station, an indicator field indicating whether to perform the CLPC process in the DCI, and an OLPC parameter included in the DCI.

The obtaining of the control information for determining whether to perform the CLPC process may include obtaining the control information for determining whether to perform the CLPC process via at least one of a sidelink master information block (MIB) or sidelink control information (SCI) transmitted by the second sidelink UE.

The providing of the TPC command information may include selecting an accumulative TPC mode or an absolute TPC mode based on at least one of a type of communication between the first and second sidelink UEs, a type of channels between the first and second sidelink UEs, RRC signaling or a SIB received from the base station, or a field indicating a TPC mode or a field indicating a TPC command, which is included in a physical sidelink broadcast channel (PSBCH) or physical sidelink control channel (PSCCH) obtained from the second sidelink UE, and providing the TPC command information corresponding to the selected TPC mode.

When the selected TPC mode is the accumulative TPC mode, a reference threshold value for stopping accumulation of transmission power values may be determined according to the type of communication between the first and second sidelink UEs.

When the selected TPC mode is the accumulative TPC mode, an accumulated transmission power value may be reset when the type of communication between the first and second sidelink UEs is changed, when an OLPC parameter is changed, when a configuration for transmission and reception resource pools is changed, or when a CLPC index is changed.

The providing of the TPC command information may include providing the TPC command information to at least one second sidelink UE via a base station or group head, wherein the TPC command information is included in group-common SCI or group-common DCI.

A format of the group-common SCI or group-common DCI may be determined based on at least one of a type of a sidelink channel, a type of a signal transmitted via sidelink, a type of communication between the first and second sidelink UEs, or a type of a sidelink UE provided with the group-common SCI or group-common DCI.

When the first sidelink UE performs a plurality of CLPC processes, the CLPC processes may be distinguished from one another by a CLPC index, and the CLPC index may be determined based on at least one of a type of communication between the first sidelink UE and at least one sidelink UE, a type of a SL channel, allocated transmission and reception resource pools, OLPC parameters, RRC signaling or DCI received from the base station, or SCI transmitted and received between the first sidelink UE and the at least one sidelink UE.

According to another embodiment of the present disclosure, a computer-readable recording medium may have recorded thereon a program for implementing the method.

According to some embodiments of the present disclosure, a method, performed by a sidelink UE, of controlling a transmission power in a wireless communication system includes: receiving, by a second sidelink UE, a sidelink measurement signal from a first sidelink UE based on control information for determining whether to perform CLPC; determining a transmission power value based on path loss information determined based on the sidelink measurement signal; transmitting a sidelink signal based on the determined transmission power value; obtaining TPC command information; and updating a transmission power value based on the obtained TPC command information.

The control information for determining whether to perform the CLPC may be obtained from at least one of a base station, the first sidelink UE, or a group head.

Whether to perform the CLPC may be determined based on at least one of a type of communication between the first and second sidelink UEs or whether at least one of the first or second sidelink UE is located within coverage of a base station.

The type of communication between the first and second sidelink UEs may be determined based on at least one of transmission and reception resource pools allocated to at least one of the first or second sidelink UE, an OLPC parameter, DCI, or RRC signaling, the DCI and the RRC signaling being received from the base station.

The updating of the transmission power value may include, when the TPC command information is command information in the accumulative TPC mode, stopping accumulating transmission power values based on a threshold value determined based on the type of communication between the first and second sidelink UEs.

According to some embodiments of the present disclosure, a first sidelink UE for controlling a transmission power for a UE in a wireless communication system includes: a transceiver configured to transmit or receive a signal to or from a base station or a second sidelink UE: a memory storing data and a program for controlling the transmission power; and a processor configured to execute the program stored in the memory to control the first sidelink UE to obtain control information for determining whether to perform a CLPC process, transmit a sidelink measurement signal to a second sidelink UE based on a result of the determining, receive a sidelink signal transmitted according to a transmission power value set based on the sidelink measurement signal, and provide TPC command information based on a transmission power value of the received sidelink signal.

According to some embodiments of the present disclosure, a second sidelink UE for controlling a transmission power for a UE in a wireless communication system includes: a transceiver configured to transmit or receive a signal to or from a base station or a first sidelink UE; a memory storing data and a program for controlling the transmission power; and a processor configured to execute the program stored in the memory to control the second sidelink UE to receive a sidelink measurement signal from a first sidelink UE based on control information for determining whether to perform CLPC, determine a transmission power value based on a path loss determined based on the sidelink measurement signal, transmit a sidelink signal based on the determined transmission power value, obtain TPC command information, and update a transmission power value based on the obtained TPC command information.

MODE OF DISCLOSURE

Hereinafter, operation principles of the present disclosure will be described in detail with reference to the accompanying drawings. In the following description of the present disclosure, when it is determined that detailed descriptions of related known functions or configurations may unnecessarily obscure the subject matter of the present disclosure, the descriptions thereof will be omitted. Furthermore, the terms used herein are defined by taking functions described in the present disclosure into account and may be changed according to a user's or operator's intent or customs. Therefore, definition of the terms should be made based on the overall descriptions in the present specification.

Similarly, in the accompanying drawings, some components are exaggerated, omitted, or schematically illustrated. Furthermore, the size of each element does not entirely reflect an actual size thereof. In the drawings, like reference numerals refer to the same or corresponding elements throughout.

Advantages and features of the present disclosure and methods of accomplishing the same will be more readily appreciated by referring to the following description of embodiments and the accompanying drawings. However, the present disclosure may be embodied in many different forms and should not be construed as being limited to the embodiments set forth below. Rather, the embodiments are provided so that the present disclosure will be thorough and complete and will fully convey the concept of the present disclosure to those of ordinary skill in the art to which the present disclosure pertains, and the present disclosure will only be defined by the appended claims. Throughout the specification, like reference numerals refer to like elements.

It will be understood that each block of the flowchart in the drawings and combinations of blocks of the flowchart may be performed by computer program instructions. These computer program instructions may be loaded into a processor of a general-purpose computer, special-purpose computer, or other programmable data processing equipment, and thus, the instructions performed via the processor of the computer or other programmable data processing equipment create a means for performing functions specified in the flowchart block(s). The computer program instructions may also be stored in a computer-executable or computer-readable memory capable of directing a computer or another programmable data processing apparatus to implement functions in a specific manner, and thus, the instructions stored in the computer-executable or computer-readable memory are capable of producing items including instruction means for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It is also noted that, in some alternative implementations, functions mentioned in blocks may occur out of order. For example, two blocks illustrated in succession may be executed substantially simultaneously, or the blocks may sometimes be executed in reverse order depending on functions corresponding thereto.

As used herein, the term "unit" denotes a software element or a hardware element such as a field-programmable gate array (FPGA) or an application-specific integrated circuit (ASIC), and performs a certain function. However, the term "unit" is not limited to software or hardware. The 'unit' may be configured to be in an addressable storage medium or configured to operate one or more processors. Thus, the term 'unit' may include, for example, elements such as software elements, object-oriented software elements, class elements, and task elements, processes, functions, attributes, procedures, subroutines, segments of program code, drivers, firmware, micro-codes, circuits, data, a database, data structures, tables, arrays, and variables. Functions provided by the elements and "units" may be combined into the smaller number of elements and "units", or may be further divided into additional elements and "units". Furthermore, the elements and "units" may be embodied to reproduce one or more central processing units (CPUs) in a device or security multimedia card. In addition, in an embodiment, the "unit" may include one or more processors.

In the following description of the present disclosure, when it is determined that detailed descriptions of related known functions or configurations may unnecessarily obscure the subject matter of the present disclosure, the descriptions thereof will be omitted. Embodiments of the present disclosure will be described in detail below with reference to the accompanying drawings.

As used in the following description, terms identifying access nodes, terms indicating network entities, terms indicating messages, terms indicating interfaces between network entities, terms indicating various types of identification information, etc. are exemplified for convenience of description. Accordingly, the present disclosure is not limited to terms to be described later, and other terms representing objects having the equivalent technical meaning may be used.

Hereinafter, for convenience of description, the present disclosure uses terms and names defined in the $3^{rd}$ Generation Partnership Project Long-Term Evolution (3GPP LTE) specifications. However, the present disclosure is not limited to the terms and names but may also be identically applied to systems that comply with other standards. In the present disclosure, evolved NodeB (eNB) may be used interchangeably with next-generation NodeB (gNB) for convenience of descriptions. In other words, a base station (BS) described as eNB may represent a gNB.

Hereinafter, a BS is an entity that allocates resources to a terminal, and may be at least one of a gNode B, an eNode B, a Node B, a BS, a wireless access unit, a BS controller, or a network node. A terminal may include a user equipment (UE), a mobile station (MS), a cellular phone, a smart phone, a computer, or a multimedia system capable of performing a communication function. However, the disclosure is not limited thereto.

In particular, the present disclosure may be applied to the 3GPP New Radio (NR) (the $5^{th}$ generation (5G) mobile communications standard). Furthermore, the present disclosure may be applied to intelligent services (e.g., smart homes, smart buildings, smart cities, smart cars or connected cars, health care, digital education, retail businesses, security and safety related services, etc.) based on the 5G communication technology and Internet of Things (IoT) related technology. In the present disclosure, eNB may be used interchangeably with gNB for convenience of descriptions. For example, a BS described as eNB may represent a gNB. Furthermore, the term 'UE' may refer to a mobile phone, narrowband IoT (NB-IoT) devices, sensors, and other wireless communication devices.

Although embodiments of the present disclosure are hereinafter described with respect to a LTE, LTE-Advanced (LTE-A), LTE Pro, or 5G (or NR as next-generation mobile communication) system, the embodiments of the present disclosure may be applied to other communication systems having similar technical backgrounds and channel configurations. Furthermore, it should be understood by those skilled in the art that the embodiments of the present disclosure are applicable to other communication systems though modifications not departing from the scope of the present disclosure.

Efforts have been made towards developing an improved 5G (NR) communication system to meet increasing demands for wireless data traffic after commercialization of $4^{th}$ generation (4G) communication systems. To achieve high data rates, 5G communication systems have been designed to use a resource in an ultra-high frequency (millimeter wave (mmW)) band (such as a 28 GHz band). To mitigate path loss and increase transmission distance during radio wave propagation in the ultra-high frequency band for 5G communication systems, technologies including beamforming, massive multiple-input multiple-output (MIMO), full dimensional MIMO (FD-MIMO), array antennas, analog beamforming, and large-scale antennas are being studied. Furthermore, unlike LTE systems, 5G communication systems support various subcarrier spacings of 15 kHz, 30 kHz, 60 kHz, 120 kHz, or the like, and a physical control channel and a physical data channel for a 5G communication system respectively utilize polar coding and low density parity check (LDPC). In addition, discrete Fourier transform spread orthogonal frequency-division multiplexing (DFT-S-OFDM) as well as cyclic prefix OFDM (CP-OFDM) are used to transmit a waveform for uplink (UL) transmission. LTE may support hybrid automatic repeat request (hybrid ARQ or HARQ) retransmission in a unit of a transport block (TB), while 5G may additionally support HARQ retransmission in a unit of code block group (CBG) including multiple CBs.

Furthermore, to improve system networks for 5G communication systems, various technologies including evolved small cells, advanced small cells, cloud radio access network (Cloud-RAN), ultra-dense networks, device to device (D2D) communication, wireless backhaul, vehicle-to-everything (V2X) networks, cooperative communication, coordinated multi-points (CoMP), and interference cancellation are currently being developed.

Moreover, the Internet has evolved from a human-centered connection network, in which humans create and consume information, to the IoT network in which dispersed components such as objects exchange information with one another to process the information. Internet of Everything (IOE) technology has emerged, in which the IoT technology is combined with, for example, technology for processing big data through connection with a cloud server. To implement the IoT, technologies such as a sensing technique, a wired/wireless communication and network infrastructure, a service interface technology, and a security technology are required. Thus, researches have recently been conducted into technologies such as sensor networks for interconnecting objects, machine to machine (M2M) communication, and machine type communication (MTC). In the IoT environment, intelligent Internet technology services may be provided to create new values for a human life by collecting and analyzing data obtained from interconnected objects. The IoT may be applied to various fields such as smart homes, smart buildings, smart cities, smart cars or connected cars, smart grid, health care, smart home appliances, and advanced medical services through convergence and integration between existing information technology (IT) and various industries.

Thus, various attempts are being made to apply a 5G communication system to the IoT network. For example, sensor networks, M2M communication, and MTC technologies are implemented using 5G communication technologies including beamforming, MIMO, and array antennas. The application of a cloud random access network (RAN) as the above-described big data processing technology is an example of convergence between the 5G and IoT technologies. As described above, a 5G communication system may provide a plurality of services to a user, and a method capable of providing each service within the same time period according to desired characteristics and an apparatus employing the method are required to provide the plurality of services to the user. Various services provided by the 5G communication system have been studied, and one of the services is a service that meets low latency and high reliability requirements.

In vehicular communication, LTE-based V2X is based on a D2D communication architecture and have been standardized in 3GPP Rel-14 and Rel-15, and efforts are currently being made to develop V2X based on 5G NR. NR V2X is expected to support unicast communication, groupcast (or multicast) communication, and broadcast communication between UEs. Furthermore, unlike LTE V2X that aims to transmit or receive basic safety information necessary for a vehicle driving on the road, NR V2X aims at providing more advanced services such as vehicle platooning, advanced driving, extended sensors, and remote driving. To support such various services and scenarios, NR V2X needs to support higher reliability and higher data rates than conventional LTE D2D or LTE V2X technologies. Accordingly, a sidelink (SL) closed-loop-based transmission power control method for controlling a transmission power between UEs is necessarily required, which was not supported by LTE D2D or LTE V2X technology.

Thus, the present disclosure provides a SL closed loop transmission power control method and device for transmitting control information and data information between UEs in a wireless communication system, and in particular, a method and device for quickly controlling a SL transmission power via downlink control information (DCI) or a SL transmission power control (TPC) command transmitted as SL control information (SCI).

FIG. 1 illustrates an example of a system for explaining an embodiment of the present disclosure.

FIG. 1A shows an example of a scenario in which all V2X UEs (UE-1 and UE-2) are located within coverage of a BS. All the V2X UEs may receive data and control information from the BS in downlink (DL) or transmit data and control information to the BS in UL. According to some embodiments, data and control information transmitted and received by the V2X UEs may be data and control information for V2X communication or data and control information for a general cellular communication other than the V2X communication. Furthermore, referring to FIG. 1A, the V2X UEs may transmit/receive data and control information for V2X communication via SL.

FIG. 1B is an example of a scenario in which UE-1 that is one of V2X UEs is located within coverage of a BS while UE-2 is located outside the coverage of the BS. An arrangement of the V2X UEs shown in FIG. 1B may be referred to as partial coverage. UE-1 located within the coverage of the BS may receive data and control information from the BS on DL or transmit data and control information to the BS on UL. UE-2 located outside the coverage of the BS is unable to receive data and control information from the BS on the DL and transmit data and control information to the BS on the UL. UE-2 may transmit/receive data and control information for V2X communication to/from UE-1 via SL.

FIG. 1C is an example of a scenario in which all V2X UEs are located outside coverage of a BS. Thus, UE-1 and UE-2 are each unable not only to receive data and control information from the BS on DL but also to transmit data and control information to the BS on UL. UE-1 and UE-2 may transmit/receive data and control information for V2X communication via SL.

FIG. 1D is an example of a scenario in which V2X communication is performed between UEs respectively located in different cells. In detail, FIG. 1D shows a scenario in which a V2X transmitter (TX) UE and a V2X receiver (RX) UE are respectively connected to different BSs (radio resource control (RRC) connected state) or camp on the different BSs (RRC inactive state, i.e., RRC idle state). In this case, UE-1 and UE-2 may be a V2X TX UE and a V2X RX UE, respectively. Alternatively, UE-1 and UE-2 may be a V2X RX UE and a V2X TX UE, respectively. UE-1 may receive a V2X-specific system information block (SIB) from the BS which UE-1 itself is connected to (or is camping on), and UE-2 may receive a V2X-specific SIB from another BS which it is connected to (or is camping on). In this case, information of the V2X-specific SIB received by UE-1 may be different from information of the V2X-specific SIB received by UE-2. Thus, it is necessary to unify information in order to perform V2X communication between UEs located in different cells.

Although FIG. 1 illustrates a V2X system composed of two UEs (UE-1 and UE-2) for convenience of description, embodiments are not limited thereto. Furthermore, UL and DL between the BS and either of the V2X UEs may be referred to as a Uu interface, and SL between the V2X UEs may be referred to as a PC5 interface. Thus, in the present disclosure, these terms may be used interchangeably. Moreover, in the present disclosure, a UE may be a vehicle supporting vehicular-to-vehicular (V2V) communication, a vehicle or a handset (i.e., a smartphone) of a pedestrian, which supports vehicular-to-pedestrian (V2P) communication, a vehicle supporting vehicular-to-network (V2N) communication, or a vehicle supporting vehicular-to-infrastructure (V2I) communication. Furthermore, in the present disclosure, the UE may mean a road side unit (RSU) equipped with UE functions, an RSU equipped with BS functions, or an RSU equipped with some of the BS and UE functions. In addition, in the present disclosure, it is predefined that a BS may support both V2X communication and general cellular communication or support only V2X communication. In this case, the BS may mean a 5G BS (gNB), a 4G BS (eNB), or an RSU. Thus, unless otherwise specified in the present disclosure, a BS and an RSU may be used to represent the same concept and thus may be used interchangeably.

FIG. 2 is an example of a V2X communication mode performed using SL, according to some embodiments of the present disclosure.

As shown in FIG. 2A, a TX UE may perform one-to-one communication with a RX UE, and the communication may be denoted as unicast communication. As shown in FIG. 2B, a TX UE and a RX UE may each perform one-to-many communication, and the communication may be denoted as a groupcast or multicast.

FIG. 2B shows an example in which UE-1, UE-2, and UE-3 form a group (group A) to perform groupcast communication while UE-4, UE-5, UE-6, and UE-7 form another group (group B) to perform groupcast communication. Each UE may perform groupcast communication only within a group to which it belongs, and UEs belonging to different groups may communicate using unicast, groupcast, or broadcast communication. Although FIG. 2B shows that the two groups are formed for communication, embodiments are not limited thereto.

Moreover, although not shown in FIG. 2, V2X UEs may each perform broadcast communication. Broadcast communication refers to a scenario in which all V2X UEs receive data and control information transmitted by a V2X TX UE via SL. For example, if UE-1 is assumed to be a TX UE for broadcast in FIG. 2B, all the other UEs (UE-2, UE-3, UE-4, UE-5, UE-6, and UE-7) may receive data and control information transmitted by UE-1.

Figure 3:
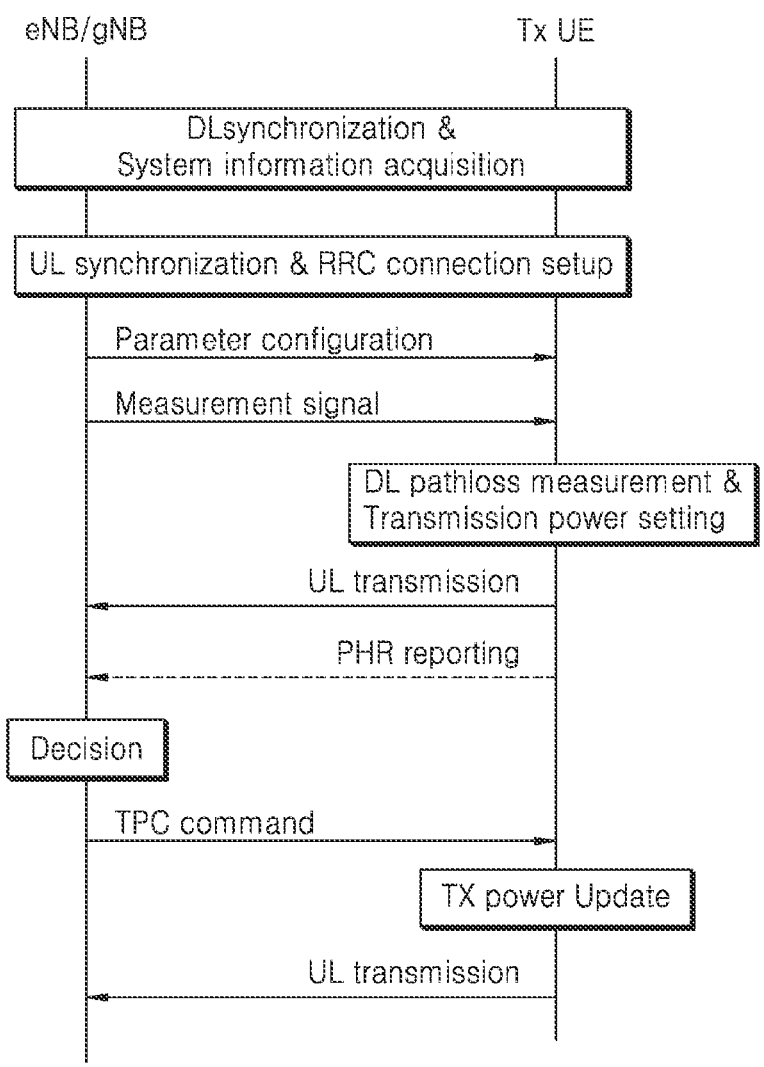
FIG. 3 illustrates a procedure, performed by a base station, of controlling transmission power of a user equipment (UE) in a cellular system, according to some embodiments of the present disclosure.

FIG. 3 illustrates a procedure, performed by a BS, of controlling transmission power of a UE in a cellular system, according to some embodiments of the present disclosure.

A UE in coverage of a BS may perform DL synchronization with the BS and obtain system information. According to some embodiments, DL synchronization may be performed using a synchronization signal, i.e., a primary synchronization signal (PSS)/a secondary synchronization signal (SSS) received from the BS. UEs that have performed the DL synchronization may receive a master information block (MIB) and a SIB from the BS and obtain system information. Then, a UE may perform a random access procedure in order to achieve UL synchronization with the BS. During the random access procedure, the UE may transmit a random access preamble and message 3 (msg3) to the BS on UL. In this case, UL TPC is performed for transmission of the random access preamble and message 3, and the UE may receive parameters for UL TPC from the BS via the SIB or use agreed parameters.

Moreover, the UE may measure a reference signal received power (RSRP) from a pathloss estimation signal transmitted by the BS and estimate a DL path loss value as defined by Equation 1. Furthermore, an UL transmission power value for transmission of the random access preamble and message 3 may be set based on the estimated DL path loss value.

$$\text{DL path loss} = \text{transmission power of BS signal} - \text{RSRP measured by UE} \quad [\text{Equation 1}]$$

In Equation 1, the transmission power of the BS signal means a transmission power of a DL pathloss estimation signal transmitted by the BS. The DL pathloss estimation signal transmitted by the BS may be a cell-specific reference signal (CRS) or a synchronization signal block (SSB). When the DL pathloss estimation signal is a CRS, the transmission power of the BS signal means a transmission power of the CRS and may be transmitted to the UE via a parameter referenceSignalPower in the system information. When the DL pathloss estimation signal is a SSB, the transmission power of the BS signal means a transmission power of a demodulation reference signal (DMRS) transmitted via a SSS and a physical broadcast channel (PBCH) and may be transmitted to the UE via a parameter ss-PBCH-BlockPower in the system information.

When an RRC connection is established between the UE and the BS, the UE may receive, from the BS, RRC parameters for UL TPC via UE-specific RRC or common RRC. In this case, the received RRC parameters for UL TPC may vary according to a type of an UL channel and a type of signal transmitted on the UL. In other words, different TPC parameters may be respectively applied to transmissions of a UL control channel (a physical UL control channel (PUCCH)), a UL data channel (a physical UL shared channel (PUSCH)), and a sounding reference signal (SRS). Furthermore, as described above, the TPC parameters received from the BS via the SIB before the UE establishes the RRC connection with the BS, or the TPC parameters used as the previously agreed parameters before the RRC connection establishment may be included in RRC parameters received from the BS after the RRC connection establishment. In this case, the UE may use values of the RRC parameters received from the BS for UL TPC after the RRC connection establishment.

Furthermore, the BS may configure channel state information-reference signal (CSI-RS) as a pathloss estimation signal after RRC connection has been established by the UE. In this case, the BS may transmit information about a transmission power of the CSI-RS to the UE via a parameter powerControlOffsetSS in UE dedicated RRC information. In this case, the parameter powerControlOffsetSS may be an offset between the transmission power of the SSB and the transmission power of the CSI-RS.

The UE may measure a DL RSRP using the CSI-RS and estimate a DL path loss value according to Equation 1 by using information about the transmission power of the CSI-RS received from the BS Furthermore, the UE may set (configure), based on the estimated path loss value, an UL transmission power value for PUCCH, PUSCH, and SRS transmissions.

Moreover, the UE may transmit a power headroom (PH) report to the BS. The PH may mean a difference between a current transmission power of the UE and a maximum output power of the UE. The BS may use the PH report received from the UE to optimize system operation. For example, if a PH value reported by a specific UE to the BS is positive, the BS may increase a system throughput by allocating more resources (RBs) to the corresponding UE. Otherwise, if a PH value reported by a specific UE to the BS is negative, the BS may allocate fewer resources to the corresponding UE or reduce a transmission power of the UE via a TPC command. Thereby, the system throughout may be increased, or unnecessary UE power consumption may be reduced.

Upon receiving a TPC command from the BS, the UE may reduce, increase, or maintain its transmission power as indicated by the TPC command (transmission power update). In this case, the TPC command may be transmitted to the UE via UE-specific DCI or group common DCI. Accordingly, the BS may dynamically control the transmission power of the UE based on the TPC command.

Figure 4:
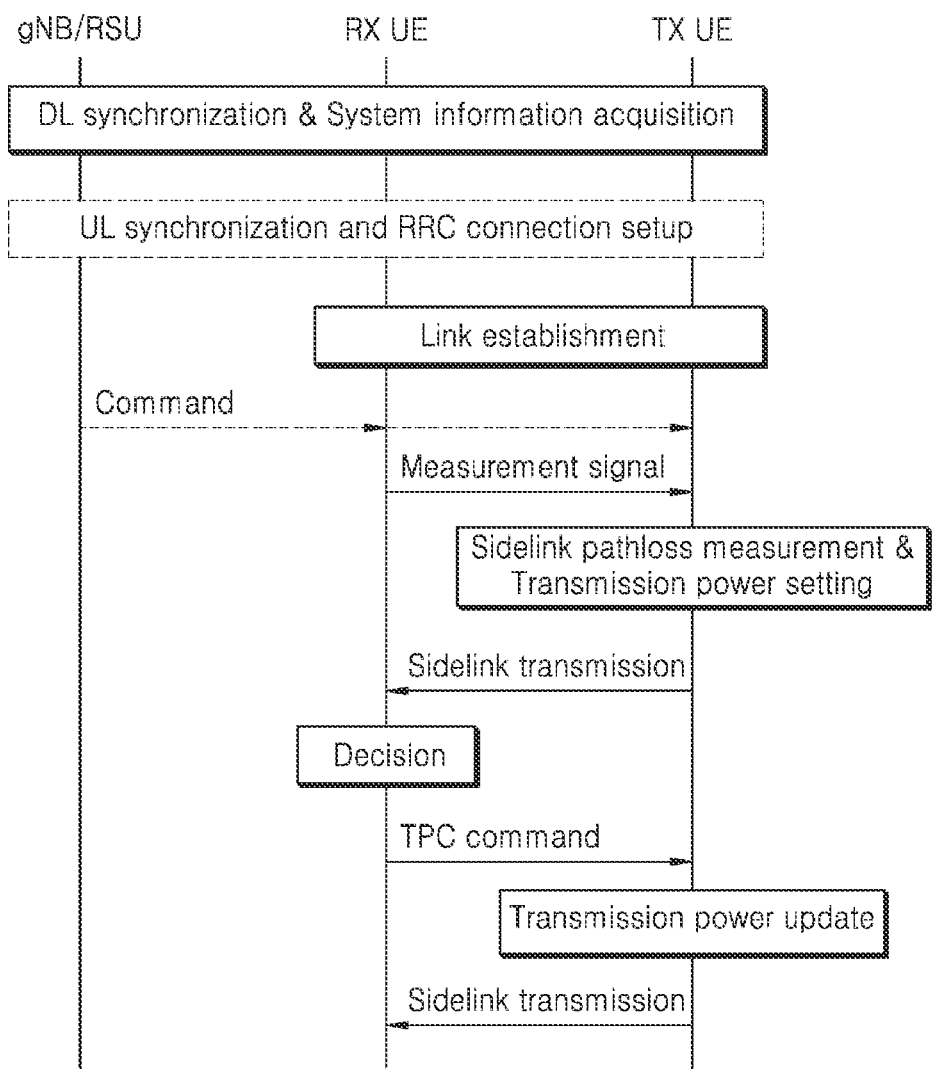
FIG. 4 illustrates an example of sidelink transmission power control according to some embodiments of the present disclosure.

FIG. 4 illustrates an example of SL TPC according to some embodiments of the present disclosure.

In conventional LTE D2D and LTE V2X, only an open-loop was used to perform power control of SL transmissions between UEs. In other words, TPC through a TPC command was not performed in SL transmission. The reason is that since the LTE D2D and V2X are designed for broadcast communication as a major scenario, a feedback mechanism was not adopted in layer-1 (physical layer) and layer-2 (data link layer) for a SL between UEs by taking into account signaling overhead. However, because NR V2X supports not only broadcast communication but also unicast communication and groupcast communication and requires higher reliability and higher data rate than the conventional D2D and V2X, a feedback mechanism may need to be introduced for link adaptation. Accordingly, not only open-loop power control (OLPC) but also closed-loop power control (CLPC) based on a TPC command may be introduced. Thus, FIG. 4 shows SL TPC performed by considering CLPC.

Referring to FIG. 4, V2X UEs in coverage of a BS may perform DL synchronization and obtain system information. In this case, the DL synchronization may be performed using a PSS/a SSS received from the BS or a synchronization signal received from a Global Navigation Satellite System (GNSS). The V2X UEs that have performed the DL synchronization may obtain system information related to V2X via a V2X-specific SIB transmitted by the BS. Furthermore, the V2X UEs within the coverage may perform UL synchronization via a random access procedure with the BS and then perform an RRC connection procedure. In this case, the UL synchronization and the RRC connection procedure may be performed by only a TX UE or RX UE, or at least one or both of the TX UE and the RX UE. Which of the TX UE and RX UE will perform the UL synchronization and RRC connection procedure may vary depending on a transmission mode for SCI/data information, a SL TPC procedure, and a signaling scheme used.

For example, in a mode in which the BS transmits, to a V2X RX UE, a command indicating transmission of a SL measurement signal as shown in FIG. 4, the V2X RX UE may need to perform UL synchronization and an RRC connection procedure with the BS.

Furthermore, according to some embodiments, a mode in which the BS transmits, to the V2X TX UE, a command indicating a request for transmission of a SL measurement signal may be taken into consideration. In this mode, the BS may command the V2X TX UE to transmit a request for transmission of the SL measurement signal to the V2X RX UE. The V2X TX UE that has received the command may transmit, to the V2X RX UE, the request for transmission of the SL measurement signal, and the V2X RX UE that has received the request may transmit the SL measurement signal to the V2X TX UE. Accordingly, in the mode in which the BS transmits, to the V2X TX UE, the command indicating the request for transmission of the SL measurement signal, the V2X TX UE may need to perform UL synchronization and an RRC connection procedure with the BS.

Furthermore, according to some embodiments, when the BS transmits a command indicating transmission of the SL measurement signal to the V2X RX UE and a command indicating reception of the SL measurement signal to the V2X TX UE, both the V2X RX UE and the V2X TX UE may need to perform UL synchronization and RRC connection procedures with the BS according to a type of a signaling scheme used. For example, when a command from the BS is transmitted to the V2X TX UE and the V2X RX UE via DCI, medium access control (MAC)-control element (CE), or UE dedicated RRC, the V2X TX UE and the V2X RX UE may both perform UL synchronization and RRC connection procedures with the BS.

Furthermore, according to some embodiments, when a command from the BS is transmitted to the V2X TX UE and the V2X RX UE via V2X system information, the V2X TX UE and the V2X RX UE may not perform UL synchronization and an RRC connection procedure with the BS.

In FIG. 4, the V2X RX UE may refer to a UE for receiving SCI and data information, and the V2X TX UE may refer to a UE for transmitting SCI and data information. Thus, referring to FIG. 4, the V2X RX UE and the V2X TX UE may be both unrelated to transmission and reception of the SL measurement signal.

According to some embodiments, the V2X TX UE or the V2X RX UE that has performed DL or UL synchronization and RRC connection establishment with the BS may perform SL establishment for unicast communication. The unicast link establishment may be performed at a higher layer (e.g., an application layer), and as shown in FIG. 4, the unicast link establishment may be performed between the V2X TX UE that attempts to transmit V2X control information/data information via unicast and the V2X RX UE that attempts to receive the same via unicast.

Furthermore, although not shown in FIG. 4, the BS may be involved in establishing a unicast link. For example, the V2X TX UE may transmit a request for unicast link establishment to the BS, and the BS may transmit a response to the unicast link establishment to the V2X RX UE. Furthermore, the BS may transmit a confirmation of the unicast link establishment to the V2X TX UE and the V2X RX UE. However, as described above, because a procedure involving the BS establishing a unicast link may be performed at a higher layer, a physical layer and a MAC layer may be unable to identify the procedure.

Upon receiving a command from the BS or when a specific condition in the V2X RX UE is satisfied, the V2X RX UE may transmit a SL measurement signal to the V2X TX UE. Furthermore, the V2X RX UE may transmit information about a transmission power of the SL measurement signal to the V2X TX UE. After receiving the information about the transmission power of the SL measurement signal, the V2X TX UE may estimate a SL path loss value by using Equation 1. The V2X TX UE may set a SL transmission power value by using the estimated SL path loss value and transmit SCI and data information based on the set transmission power value.

The V2X RX UE may receive the SCI and data information transmitted by the V2X TX UE and determine whether the SL transmission power value is to be increased or decreased. Furthermore, the V2X RX UE may transmit, to the V2X TX UE, information about a transmission power value required for a next SL transmission via a TPC command. Upon receiving the TPC command, the V2X TX UE may transmit SCI and data information by reflecting the TPC command from the V2X RX UE in the next SL transmission.

In FIG. 4, the V2X TX UE may set, to 0 dB, a CLPC process for the SCI and data information transmitted by the V2X TX UE itself up until the reception of a TPC command from the V2X RX UE.

Moreover, although FIG. 4 illustrates a case where the BS exists, the SL TPC of FIG. 4 may be performed even when the BS does not exist. For example, the V2X TX UE and the V2X RX UE may achieve time/frequency synchronization through a SL synchronization procedure or via a GNSS and establish a unicast link therebetween. Furthermore, without a command from the BS, it is possible to transmit and receive a SL measurement signal and perform a SL TPC procedure as shown in FIG. 4.

Figure 5:
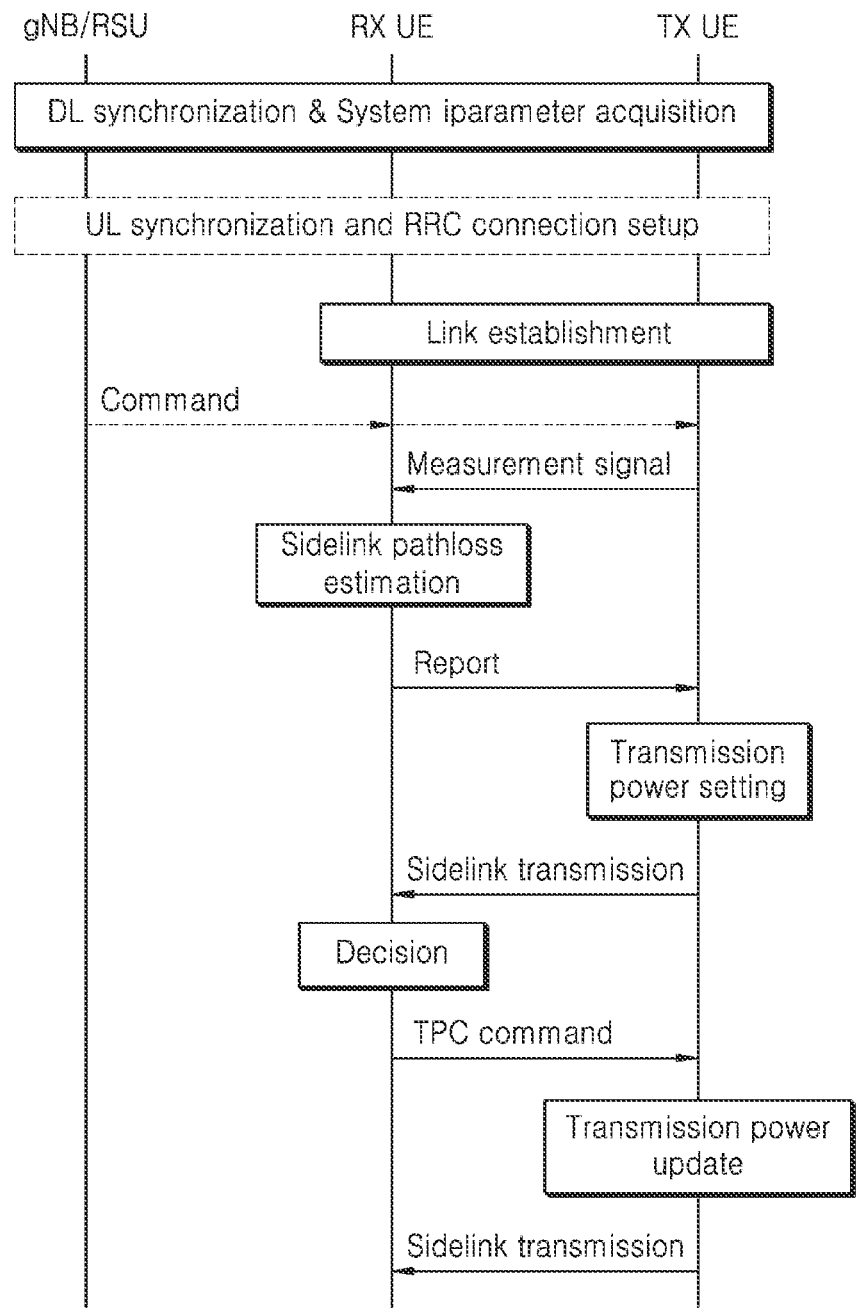
FIG. 5 illustrates another example of sidelink transmission power control according to some embodiments of the present disclosure.

FIG. 5 illustrates another example of SL TPC according to some embodiments of the present disclosure.

FIG. 5 is another example of SL transmission power considering application of SL CLPC as described with reference to FIG. 4. Referring to FIG. 5, V2X UEs in coverage of a BS may perform DL synchronization and obtain system information. In this case, the DL synchronization may be performed using a PSS/a SSS received from the BS or a synchronization signal received from a GNSS. The V2X UEs that have performed the DL synchronization may obtain system information related to V2X via a V2X-specific SIB transmitted by the BS. Furthermore, the V2X UEs within the coverage may perform UL synchronization via a random access procedure with the BS and then perform an RRC connection procedure. In this case, the UL synchronization and the RRC connection procedure may be performed by only a TX UE or RX UE, or at least one or both of the TX UE and the RX UE. Which of the TX UE and RX UE is to perform the UL synchronization and RRC connection procedure may vary depending on a transmission mode for SCI/data information, a SL TPC procedure, and a signaling scheme used.

For example, in a mode in which the BS transmits, to a V2X TX UE, a command indicating transmission of a SL measurement signal as shown in FIG. 5, the V2X TX UE may need to perform UL synchronization and an RRC connection procedure with the BS.

Furthermore, according to some embodiments, a mode in which the BS transmits, to a V2X RX UE, a command indicating a request for transmission of a SL measurement signal may be considered. In the mode in which the BS transmits, to the V2X RX UE, the command indicating the request for transmission of the SL measurement signal, the BS may command the V2X RX UE to transmit the request for transmission of the SL measurement signal to the V2X TX UE. The V2X RX UE that has received the request may transmit, to the V2X TX UE, the request for transmission of the SL measurement signal, and the V2X TX UE that has received the request may transmit the SL measurement signal to the V2X RX UE. Accordingly, in this mode, the V2X RX UE may need to perform UL synchronization and an RRC connection procedure with the BS.

Furthermore, according to some embodiments, when the BS transmits a command indicating transmission of the SL measurement signal to the V2X RX UE and a command indicating reception of the SL measurement signal to the V2X TX UE, both the V2X RX UE and the V2X TX UE may need to perform UL synchronization and RRC connection procedures with the BS according to a type of a signaling scheme used. For example, when a command from the BS is transmitted to the V2X TX UE and the V2X RX UE via DCI, medium access control (MAC)-control element (CE), or UE dedicated RRC, the V2X TX UE and the V2X RX UE may both perform UL synchronization and RRC connection procedures with the BS.

Furthermore, according to some embodiments, when a command from the BS is transmitted to the V2X TX UE and the V2X RX UE via V2X system information, the V2X TX UE and the V2X RX UE may not perform UL synchronization and an RRC connection procedure with the BS.

In FIG. 5, the V2X RX UE may refer to a UE for receiving SCI and data information, and the V2X TX UE may refer to a UE for transmitting SCI and data information. Thus, referring to FIG. 5, the V2X RX UE and the V2X TX UE may be both unrelated to transmission and reception of the SL measurement signal.

The V2X TX UE or the V2X RX UE that has performed DL or UL synchronization and RRC connection establishment with the BS may perform SL establishment for unicast communication. The unicast link establishment may be performed at a higher layer (e.g., an application layer), and as shown in FIG. 5, the unicast link establishment may be performed between the V2X TX UE that attempts to transmit V2X control information/data information via unicast and the V2X RX UE that attempts to receive the same via unicast.

Furthermore, although not shown in FIG. 5, the BS may involve in establishing a unicast link. For example, the V2X TX UE may transmit a request for unicast link establishment to the BS, and the BS may transmit a response to the request for unicast link establishment to the V2X RX UE. Furthermore, the BS may transmit a confirmation of the unicast link establishment to the V2X TX UE and the V2X RX UE. However, as described above, because a procedure in which the BS involves in unicast link establishment may be performed at a higher layer, a physical layer and a MAC layer may be unable to identify the procedure.

Upon receiving a command from the BS or when a specific condition in the V2X TX UE is satisfied, the V2X TX UE may transmit a SL measurement signal to the V2X RX UE. Furthermore, the V2X TX UE may transmit information about a transmission power of the SL measurement signal to the V2X RX UE. After receiving the information about the transmission power of the SL measurement signal, the V2X RX UE may estimate a SL path loss value by using Equation 1. The V2X RX UE may report the estimated SL path loss value to the V2X TX UE. The V2X TX UE may set a SL transmission power value by using the SL path loss value reported by the V2X RX UE and transmit SCI and data information based on the set transmission power value.

The V2X RX UE may receive the SCI and data information transmitted by the V2X TX UE and determine whether the SL transmission power value is to be increased or decreased. Furthermore, the V2X RX UE may transmit, to the V2X TX UE, information about a transmission power value required for a next SL transmission via a TPC command. Upon receiving the TPC command, the V2X TX UE may transmit SCI and data information by reflecting the TPC command from the V2X RX UE in the next SL transmission.

In FIG. 5, the V2X TX UE may set, to 0 dB, a CLPC process for the SCI and data information transmitted by the V2X TX UE itself up until the reception of a TPC command from the V2X RX UE.

Furthermore, according to some embodiments, unlike in FIG. 5, the V2X TX UE may transmit a SL measurement signal while simultaneously transmitting SCI and data information. In addition, according to some embodiments, the V2X RX UE may report a path loss value while simultaneously transmitting a TPC command. In this case, the SL measurement signal transmitted by the V2X TX UE is a DMRS transmitted on a SL control channel (physical SL control channel (PSCCH)) or a SL data channel (physical SL shared channel (PSSCH)), or a DMRS transmitted via a SL synchronization signal or a SL broadcast channel (physical SL broadcast channel (PSBCH)). In addition, the V2X RX UE may transmit a feedback channel including a TPC command, via which its own estimated path loss value and its own measured RSRP value are reported to the V2X TX UE. The feedback channel at this time may be a separate feedback channel different from the SL control channel or SL data channel transmitted by the V2X TX UE.

Moreover, although FIG. 5 illustrates a case where the BS exists, a SL TPC procedure may be performed even when the BS does not exist. For example, the V2X TX UE and the V2X RX UE may achieve time/frequency synchronization through a SL synchronization procedure or via a GNSS and establish a unicast link therebetween. Furthermore, without a command from the BS, it is possible to transmit and receive a SL measurement signal and perform a SL TPC procedure as shown in FIG. 5.

FIGS. 4 and 5 illustrate procedures for performing SL CLPC based on a TPC command. However, CLPC may not necessarily be applied. For example, it may be undesirable to apply CLPC in broadcast communication when considering signaling overhead as introduced in conventional D2D and V2X communications. Furthermore, when a TX UE and a RX UE are both outside coverage of a BS as shown in FIG. 1C, CLPC may not be appropriate because precise power control cannot be achieved due to the absence of an entity for coordinating power control. Thus, it may be necessary to determine whether CLPC is to be applied according to a situation and an environment for a UE (i.e., whether the UE is within or outside the coverage of the BS, etc.) or a V2X communication mode of the UE (i.e., unicast communication, groupcast communication, and broadcast communication).

[Alternatives for Determining when to Apply CLPC]

There may be various alternatives as follows, and V2X TX and RX UEs may determine whether to apply CLPC through at least one of the following alternatives.

Alt1: Whether to apply CLPC is determined according to rules agreed in advance between the V2X TX and RX UEs.

Alt1-1: Whether to apply CLPC is determined according to a V2X communication mode.

As described above, whether to apply CLPC may be determined in advance according to unicast, groupcast, and broadcast communication modes. For example, V2X TX and RX UEs may agree in advance not to perform CLPC in a groupcast or broadcast communication mode. In this case, it may be necessary to consider how V2X UEs are able to recognize each communication mode.

According to some embodiments, a transmission or reception resource pool for V2X communication may be mapped to each communication mode. In detail, resource pool 1, resource pool 2, and resource pool 3 may be respectively mapped to a unicast communication mode, a groupcast communication mode, and a broadcast communication mode, and a V2X UE may infer each communication mode from a transmission or reception resource pool, which has been assigned thereto by a BS or a group communication leader acting like the BS or has been preconfigured for V2X transmission and reception, and determine whether CLPC is to be applied. In the above example, under the assumption that the CLPC is performed only in the unicast and groupcast communication modes, the V2X UEs may determine that the CLPC is to be performed when resource pool 1 and resource pool 2 are used for V2X communication.

Furthermore, according to some embodiments, the CLPC may have a correlation with at least one of OLPC parameters. For example, among the OLPC parameters, $P_0(j)$ and $\alpha(j)$ may have a correlation with the CLPC. In this case, $P_0$ may be a parameter for controlling a target reception power at a RX side and may be composed of a sum of a UE-specific value $P_{0\_UE\text{-}specific}$ and a UE-common value $P_{0\_UE\text{-}common}$ (i.e., $P_0(j)=P_{0\_UE\text{-}specific}(j)+P_{0\_UE\text{-}common}(j)$). Furthermore, $\alpha$ may be a parameter for compensating for a path loss. In this case, j may indicate a V2X communication mode, and for example, j=0, j=1, and j=2 may be respectively defined as a unicast communication mode, a groupcast communication mode, a broadcast communication mode. Thus, under the assumption that the CLPC is performed only in the unicast and groupcast communication modes, when values $P_0$ or $\alpha$ for j=0 and j=1 are set, the UE may determine that the CLPC is to be performed. In this case, for $P_{0\_UE\text{-}common}$, the same value may be applied to at least one V2X communication mode (i.e., to at least one value j), and different values may be used for $P_{0\_UE\text{-}specific}$ according to the value j. In addition, the same values for both $P_{0\_UE\text{-}common}$ and $P_{0\_UE\text{-}specific}$ may be applied to at least one V2X communication mode (e.g., the same values $P_{0\_UE\text{-}common}$ and $P_{0\_UE\text{-}specific}$ are respectively used when j=1 and j=2).

Alt1-2: Whether to apply CLPC is determined according to a situation at a UE.

When the V2X TX and RX UEs are both within the coverage of the BS as shown in FIGS. 1A and 1D, a SL transmission signal may cause interference to a signal received by the BS. Since patterns of the interference may change dynamically, CLPC may be performed on SL to address this problem. In this case, a SL CLPC mechanism may be performed as agreed between the V2X TX and RX UEs without control or involvement by the BS.

When the V2X TX and RX UEs are both outside the coverage of the BS as shown in FIG. 1C, CLPC cannot be performed in SL due to the absence of a coordinator. Thus, the CLPC may not be performed in this scenario.

Moreover, as shown in FIG. 1B, a scenario in which the V2X TX UE is within the coverage of the BS while the V2X RX UE is outside the coverage of the BS may be considered. In this case, as described above, a SL transmission signal transmitted by the V2X TX UE within the coverage of the BS to the V2X RX UE outside the BS coverage may cause interference to a signal received by the BS. Thus, SL CLPC may need to be performed.

Alt1-3: Combination of Alt1-1 and Alt1-2

Various combinations of Alt1-1 and Alt1-2 may be possible. For example, when the V2X RX UE is within coverage of the same BS as for the V2X TX UE (FIG. 1A), within coverage of a BS different from that for the V2X TX UE (FIG. 1D), and outside coverage of a BS (FIG. 1C), SL CLPC may be performed as long as the V2X TX UE is within the coverage of the BS and when a unicast V2X communication mode is used.

Alt2: RRC Configuration is Received from the BS

V2X UEs located within the coverage of the BS may receive configuration of whether to perform SL CLPC via RRC signaling from the BS. In this case, the RRC signaling may be performed via V2X-specific system information (SIB) or via UE-specific RRC or UE common RRC.

Alt3: Indication is Received from the BS Via V2X-Specific DCI

V2X UEs located within the coverage of the BS (that may refer to either or both of a V2X TX UE and a V2X RX UE) may receive, from the BS, an indication of whether to perform SL CLPC via V2X-specific UE-specific DCI (DCI format X1) or V2X-specific group-common DCI (DCI format X2). In this case, a radio network temporary identifier (RNTI) that is different from that for UE-specific DCI or group common DCI used in conventional cellular communication may be used to differentiate the DCI format X1 or DCI format X2 from DCI transmitted in the conventional cellular communication. When the BS indicates, by using the DCI format X1 or DCI format X2, to a V2X UE whether to perform CLPC, at least one of the following methods may be used.

According to some embodiments, the BS may implicitly indicate to the V2X UE whether to perform SL CLPC. For example, when a bit field for a TPC command included in the DCI format X1 or DCI format X2 is set to a specific value (i.e., if the bit field for the TPC command contains all 0s or all 1s), V2X UEs that have received the DCI format X1 or DCI format X2 may not apply CLPC to SCI or data information scheduled by the corresponding DCIs. Alternatively, only when the bit field for the TPC command included in the DCI format X1 or DCI format X2 is set to a specific value, V2X UEs that have received the DCI format X1 or DCI format X2 may apply SL CLPC only to SCI or data information scheduled by the corresponding DCIs.

Furthermore, according to some embodiments, the BS may explicitly indicate to a V2X UE whether to perform SL CPLC. For example, a 1-bit field may be added to the DCI format X1 or DCI format X2. When the corresponding field indicates '0', the V2X UEs that have received the DCI format X1 or DCI format X2 may not apply CLPC to SCI and data information scheduled by the corresponding DCIs. Otherwise, when the corresponding field indicates '1', V2X UEs that have received the DCI format X1 or DCI format X2 may apply SL CLPC to SCI or data information scheduled by the corresponding DCIs.

Furthermore, according to some embodiments, the BS may map the index j of the above-described OLPC parameter to information about whether CLPC is to be applied and transmit the index j in the DCI format X1 or DCI format X2. In detail, under the assumption that j=0 indicates that CLPC is applied and j=1 and j=2 indicate that the CLPC is not applied, when the index j is set to 0 via a bit field in DCI format X1/X2, a V2X UE that has received the DCI format X1/X2 may recognize that the CLPC is to be applied to SCI or data information scheduled by the corresponding DCIs.

Alt4: Signaling is Received from a V2X TX or RX UE

A V2X UE located in the coverage of the BS may receive, from the BS, configuration or indication of whether to perform the SL CLPC by using at least one of the various alternatives described as Alt1, Alt2, or Alt3. After receiving the configuration or indication of whether to perform the SL CLPC, the V2X UE may transmit information about whether to perform the SL CLPC to a V2X UE located outside the coverage of the BS via SL broadcast information transmitted over a SL broadcast channel (PSBCH), SCI transmitted over a SL control channel (PSCCH), or SCI and data information transmitted over a SL data channel (PSSCH). When the information about whether to perform the SL CLPC is transmitted via SCI from the V2X UE within the coverage to the V2X UE out of the coverage, the SCI at this time may have a format (i.e., SCI format Y) different than SCI used in conventional D2D and V2X.

Furthermore, according to some embodiments, when a V2X TX UE is located outside the coverage of the BS, the V2X TX UE may transmit information about whether to perform CLPC to a V2X RX UE located outside the coverage of the BS or a V2X RX UE located within coverage of another BS via SCI transmitted over a SL control channel or SCI and data information transmitted over a SL data channel. On the other hand, when a V2X RX UE is outside the coverage of the BS, the V2X RX UE may transmit information about whether to perform CLPC to a V2X TX UE located outside the coverage of the BS or a V2X TX UE located within coverage of another BS via SCI transmitted over a SL control channel, SCI and data information transmitted over a SL data channel, or a separate SL feedback channel.

Figure 6:
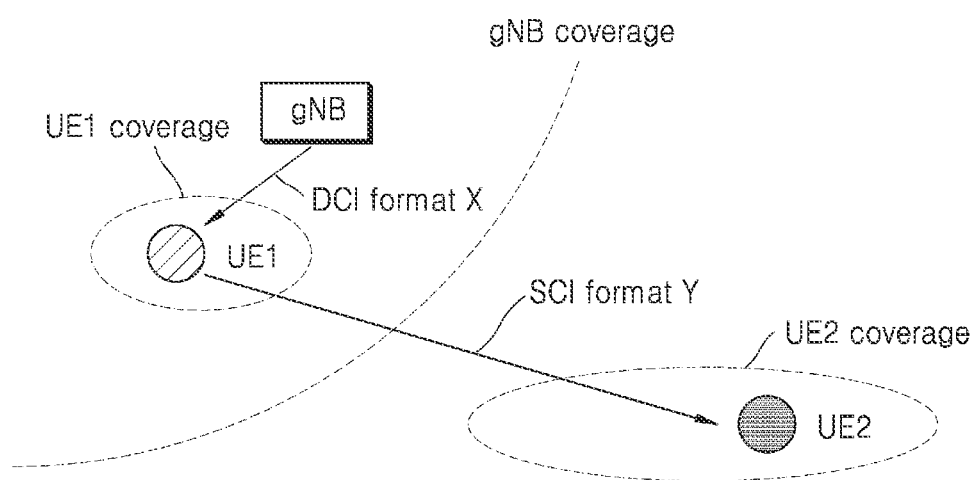
FIG. 6 illustrates a method of transmitting information about whether closed loop power control (CLPC) is to be applied, according to some embodiments of the present disclosure.

FIG. 6 illustrates a method of transmitting information about whether CLPC is to be applied, according to some embodiments of the present disclosure.

FIG. 6 shows an example in which UE1 is located within coverage of a BS while UE2 is located outside the coverage of the BS. The UE1 located within the coverage of the BS may perform TPC when transmitting SCI and data information on SL. In this case, the purpose of TPC may be to increase the reliability of reception of signals received by a serving BS and reduce the amount of interference caused to its neighboring BS. Thus, a serving BS for UE1 may be involved in controlling transmission power for SCI and data information transmitted by UE1. For this purpose, the serving BS may indicate whether to perform SL CLPC in V2X-specific DCI (the above-described DCI format X1/X2) field information transmitted to UE1. A V2X UE that has received an indication of whether to perform the SL CLPC from the serving BS may transmit, via SCI, the indication to other V2X UEs outside the coverage of the BS, with which the V2X UE intends to communicate. In this case, the SCI may be transmitted through a SL control channel.

Although FIG. 6 illustrates alternative Alt3 in which the BS indicates to UE1 whether to perform the SL CLPC via V2X-specific DCI, the above-described alternative Alt2 may also be applied. Although it is assumed in FIG. 6 that UE1 and UE2 are a V2X TX UE and a V2X RX UE, respectively, UE1 and UE2 may be a V2X RX UE and a V2X TX UE, respectively.

Moreover, although not shown in FIG. 6, UE1 may be a UE for transmitting a SL synchronization signal to other V2X UEs outside the coverage of the BS. In this case, the UE for transmitting a SL synchronization signal may be a TX UE that transmits at least one of V2X control information or data information, or a UE that transmits the SL synchronization signal regardless of transmission of the V2X control information and data information (in other words, even if there is no V2X control information and data information to be transmitted, a UE for transmitting a SL synchronization signal under a specific condition). In this case, UE1 for transmitting a synchronization signal, which has received, from the BS, a command indicating whether to perform SL CLPC via RRC configuration or via DCI format X1/X2, may transmit information about whether to perform the SL CLPC to UE2 via a bit field in a SL broadcast channel (PBCH).

Figure 7:
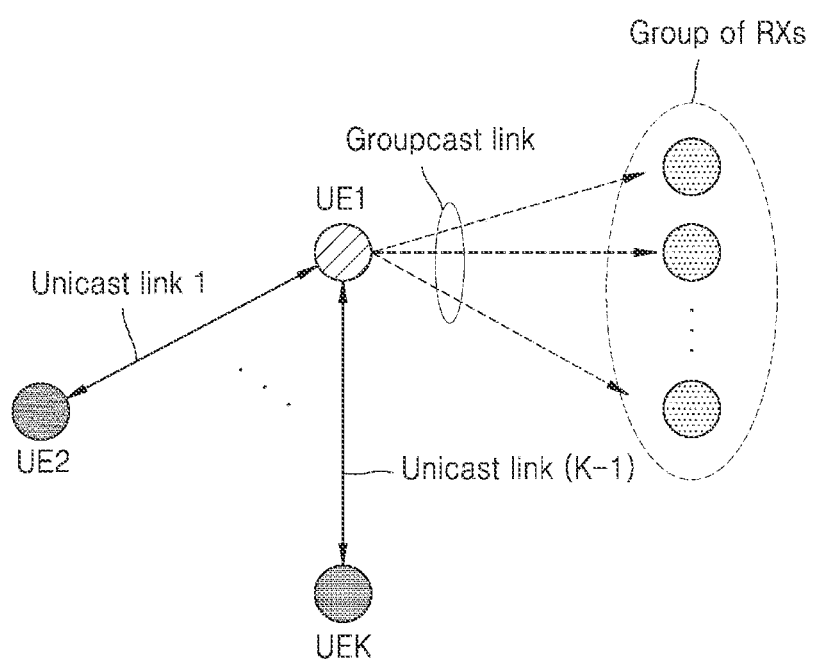
FIG. 7 is an example in which one V2X UE establishes two or more V2X communication links, according to some embodiments of the present disclosure.

FIG. 7 is an example in which one V2X UE establishes two or more V2X communication links with other V2X UEs, according to some embodiments of the present disclosure.

UE-1 may establish K-1 unicast links with UE-2 and UE-K (K≥2). In this case, UE-1, UE-2, and UE-K may each be a V2X TX UE or a V2X RX UE. Referring to FIG. 7, V2X unicast communications are not simultaneously performed via the K-1 unicast links, but two or more unicast links may be maintained during a specific time period. During the time period, UE-1 may transmit control information and data information for V2X groupcast to RXs in a specific group. Furthermore, although not shown in FIG. 7, UE-1 may receive control information and data information for V2X groupcast from a specific V2X TX UE while maintaining the K-1 V2X unicast links with UE-2 and UE-K. In such an environment, patterns of interference experienced by a unicast link may be different from patterns of interference experienced by a groupcast link. Furthermore, patterns of interference experienced between unicast links or groupcast links may be different from one another. Thus, the UE needs to perform two or more CLPC processes. Various methods may be used to support the two or more CLPC processes, and at least one of the following alternatives may be applied.

[Alternatives for Performing Two or More CLPC Processes]

An index of the SL CLPC process may be denoted by I (I≥2).

Alt1: An index of a CLPC process is determined according to rules agreed in advance between V2X TX and RX UEs Alt1-1: An index of a CLPC process is determined according to a V2X communication mode.

An index of a CLPC process may be determined in advance according to unicast, groupcast, and broadcast communication modes. For example, an index I of a CLPC process may be predefined as I=0 in a unicast communication mode, I=1 in a groupcast communication mode, and I=2 in a broadcast communication mode. Alternatively, I=0 may be used as an index of a CLPC process in a unicast communication mode, I=1 may be used as an index thereof in a groupcast communication mode, and CLPC may not be performed in a broadcast communication mode.

In addition, according to some embodiments, CLPC may be performed only in the unicast communication mode and may not be performed in the groupcast and broadcast communication modes. In this case, in the unicast communication mode, different CLPC processes may be used according to a type of a SL channel. For example, a CLPC process used for a SL control channel may be different from that used for a SL data channel.

Furthermore, according to some embodiments, LTE V2X and NR V2X communication modes may coexist. In this case, I=0 may be used as an index of a CLPC process in LTE V2X communication, and for NR V2X, indices of CLPC processes may be respectively predefined as I=1 in a unicast communication mode, I=2 in a groupcast communication mode, and I=3 in a broadcast communication mode.

Alt1-2: Indices of CLPC processes are pre-mapped to V2X communication parameters A transmission or reception resource pool for V2X communication may be mapped to a CLPC process. In detail, I=0, I=1, and I=2 may be respectively mapped to resource pool 0, resource pool 1, and resource pool 2, and a V2X UE may determine an index of a CLPC process from a transmission or reception resource pool, which has been assigned thereto by the BS or a group communication leader acting like the BS or has been preconfigured for V2X transmission and reception. In the above-described embodiment, an index of a resource pool is identical to an index of a CLPC process, but embodiments are not limited thereto. Furthermore, although, in the above-described embodiment, one resource pool is mapped to an index of one CLPC process, the present disclosure does not exclude an embodiment in which two or more resource pools are mapped to an index of one CLPC process or in which indices of two or more CLPC processes are mapped to one resource pool.

In addition, according to some embodiments, an index of a CLPC process may have a correlation with at least one of OLPC parameters. For example, among the OLPC parameters, $P_0(j)$ and $\alpha(j)$ may have a correlation with an index of a CLPC process. $P_0$ may be a parameter for controlling a target reception power at a RX side and may be composed of a sum of a UE-specific value $P_{0\_UE\text{-}specific}$ and a UE-common value $P_{0\_UE\text{-}common}$ (i.e., $P_0(j)=P_{0\_UE\text{-}specific}(j)+P_{0\_UE\text{-}common}(j)$). Furthermore, $\alpha$ may be a parameter for compensating for a path loss. In this case, j may indicate a V2X communication mode, and for example, j=0, j=1, and j=2 may be respectively defined as unicast, groupcast, and broadcast communication modes. In this case, there may be a correlation between an index I of a CLPC process and an index j representing an OLPC parameter (e.g., I=0 for j=0 and I=1 for j=1 and j=2). This correlation may be configured via RRC. Thus, when the BS configures for a UE an index j representing an OLPC parameter via RRC or indicates to the UE the index j via DCI, the UE may infer the index I of the CLPC process from the index j representing the OLPC parameter.

Alt2: CLPC Index Information is Configured by the BS Via RRC

V2X UEs located within the coverage of the BS may receive, from the BS, configuration of an index of a SL CLPC process that is to be performed by each V2X UE via RRC signaling. In this case, the RRC signaling may be performed via V2X-specific system information (SIB) or via UE-specific RRC or UE common RRC. On the other hand, the BS may limit, via RRC configuration, a maximum number of SL CLPC processes that the V2X UEs within its coverage are to maintain.

Alt3: Indication is Received from the BS Via V2X-Specific DCI

The BS may indicate to V2X UEs located within the coverage of the BS (that may refer to either or both of a V2X TX UE and a V2X RX UE), an index of a SL CLPC process via V2X-specific UE-specific DCI (DCI format X1) or V2X-specific group-common DCI (DCI format X2). In this case, an RNTI that is different from that for UE-specific DCI or group common DCI used in conventional cellular communication may be used to differentiate the DCI format X1 or DCI format X2 from DCI transmitted in the conventional cellular communication.

Alt4: Signaling is Received from a V2X TX or RX UE.

A V2X UE located in the coverage of the BS may receive, from the BS, configuration or indication of an index of a CLPC process by using at least one of the various alternatives described as Alt1, Alt2, or Alt3. After receiving the configuration or indication of the index of the SL CLPC process, the V2X UE may transmit the index of the SL CLPC process to a V2X UE located outside the coverage of the BS via SL broadcast information transmitted on a SL broadcast channel (PSBCH), SCI transmitted over a SL control channel (PSCCH), or SCI and data information transmitted over a SL data channel (PSSCH). When the index of the SL CLPC process is transmitted via SCI from the V2X UE within the coverage to the V2X UE out of the coverage, the SCI at this time may have a format (i.e., SCI format Y) different than SCI used in conventional D2D and V2X.

Furthermore, as another example, when a V2X TX UE is located outside the coverage of the BS, the V2X TX UE may transmit an index of a SL CLPC process to a V2X RX UE located outside the coverage of the BS or a V2X RX UE located within coverage of the BS via SL broadcast information transmitted over a SL broadcast channel, SCI transmitted over a SL control channel, or SCI and data information transmitted over a SL data channel. On the other hand, when a V2X RX UE is outside the coverage of the BS, the V2X RX UE may transmit an index of a SL CLPC process to a V2X TX UE located outside the coverage of the BS or a V2X TX UE located within coverage of another BS via SL broadcast information transmitted over a SL broadcast channel, SCI transmitted over a SL control channel, SCI and data information transmitted over a SL data channel, or a separate SL feedback channel.

Moreover, in a conventional cellular system, a UE may receive a TPC command from a BS via UE-specific DCI or group common DCI. The UE that has received the TPC command may perform different operations according to two TPC modes as follows.

Accumulative TPC

The UE updates a CLPC process by accumulating TPC commands received via UE-specific DCI or group common DCI. The UE transmits a UL data channel (PUSCH) and a control channel (PUCCH) or SRS by reflecting the updated CLPC process in setting of a transmission power value.

The accumulative TPC command is suitable for a scenario in which the UE receives a TPC command in consecutive subframes from the BS, and the BS and the UE may finely adjust a transmission power based on the accumulative TPC command.

Absolute TPC

Unlike in the accumulative TPC, in absolute TPC, the UE does not accumulate TPC commands previously received via DCI. For example, based on a TPC command received in an (n−4)-th subframe, the UE may update a CLPC process without accumulation and set a transmission power value. The set transmission power value is applied to UL transmission in an n-th subframe.

The absolute TPC in which accumulation is not performed may make it impossible to finely adjust a transmission power but may be advantageously applied when the UE does not frequently perform UL transmission or when the inter-cell interference is dynamically changed.

The BS may configure whether the UE should use accumulative TPC or absolute TPC via a UE-specific RRC. The UE may use accumulative TPC in a default mode before a RRC connection is established. However, embodiments are not limited to the above example.

As described above, since there are scenarios to which the accumulative TPC and the absolute TPC are to be advantageously applied or their own advantages, both modes may be applied in a NR V2X system. However, unlike in conventional cellular communication, for the NR V2X system, a scenario in which a V2X UEs are located within coverage of BSs in different cells or outside coverage of the BS may be taken into account. Thus, a method of signaling TPC mode configuration may be required, and at least one of the following methods may be used.

Alt1: A TPC Mode is Determined According to Rules Agreed in Advance Between V2X TX and RX UEs Alt1-1: A TPC Mode is Determined According to a V2X Communication Mode A TPC mode may be determined in advance according to unicast, groupcast, and broadcast communication modes. For example, it may be predefined that an accumulative TPC mode is used in a unicast communication mode while an absolute TPC mode is used in groupcast and broadcast communication modes.

Alt1-2: A TPC Mode is Determined According to a Type of a Physical Channel for V2X Communication Which TPC mode is to be applied may be determined in advance according to a type of a physical channel in SL. For example, it may be predefined that an absolute TPC mode is used for a SL data channel regardless of a V2X communication mode while an accumulative TPC mode is used for a SL control channel regardless of a V2X communication mode.

Alt1-3: A TPC Mode is Determined According to a Combination of Alt1-1 and Alt1-2 Described Above.

Which TPC mode is to be applied is basically determined in advance basically according to a type of physical channel in SL and may also be determined according to a V2X communication mode. For example, for a SL data channel, an absolute TPC mode may be used only when a unicast communication mode is applied, and a TPC mode may not be applied in groupcast and broadcast communication modes (i.e., neither the absolute nor accumulative TPC mode is used). Also for a SL control channel, an absolute TPC mode may be used only when a unicast communication mode is applied, and a TPC mode may not be applied in groupcast and broadcast communication modes (i.e., neither the absolute nor accumulative TPC mode is used).

Alt2: A TPC Mode is Configured by the BS Via RRC

V2X TX and RX UEs may receive, via V2X-specific SIB or UE-specific RRC signaling, configuration of a TPC mode from the BS on which they are camping (with which they are having no RRC connection) or to which they are connected (RRC connected).

Alt3: Signaling is Received from a V2X TX or RX UE.

A V2X TX or RX UE may signal a TPC mode via a SL broadcast channel (PSBCH) or a SL control channel (PSCCH). For example, in a 1-bit field in a SL broadcast channel or SL control channel, '1' may indicate that an absolute TPC mode is used, and '0' may indicate that an accumulative TPC mode, which is a default mode, is used. On the other hand, if there is no field indicating a TPC mode in the SL broadcast channel or SL control channel, the UE may use an accumulative TPC mode by default.

Furthermore, according to some embodiments, implicit signaling may be used instead of the above-described explicit signaling. In other words, when a specific bit field (e.g., a field indicating a TPC command) in a SL broadcast channel or SL control channel is set to a particular value (i.e., when bits in the bit field are all set to '0' or '1'), the UE may use the absolute TPC mode, and otherwise, it may use the accumulative TPC mode.

The above-described Alt3 may operate based on Alt2. In other words, V2X UEs located in the coverage of the BS may receive, from the BS, signaling indicating information about a TPC mode that they can use via V2X-specific DCI or V2X-specific SIB and UE-specific RRC configuration. Based on this principle, as described with respect to Alt3, a V2X UE within the coverage of the BS may transmit information about a TPC mode to a V2X UE outside the coverage of the BS (or a V2X UE in coverage of another BS) via a SL broadcast channel or SL control channel.

When the accumulative TPC is used, operations of the UE with respect to when to stop an accumulation operation and when to reset a CLPC process may be required.

When the UE Needs to Stop an Accumulation Operation

When a transmission power value calculated and set by the UE reaches a specific threshold value, and a TPC command received from the BS indicates a positive value, the UE may stop an accumulation operation.

For example, when it is assumed that a previously stored UE transmission power value for a CLPC process and its threshold value are respectively P0 and P1 and that the UE has received a TPC command from the BS to increase its transmission power value by 3 dB (i.e., +3 dB), a case in which P0+3 dB>P1 may occur, and in this case, the UE may stop an accumulation operation (i.e., a transmission power value for the CLPC process is set using the previously stored UE transmission power value P0 without accumulation).

In this case, the threshold value P1 may be a maximum UE output power Pcmax that may vary according to a V2X communication mode. In other words, a value of Pcmax may vary according to unicast, groupcast, and broadcast communication modes. Alternatively, the same Pcmax may be used regardless of a communication mode, but a value of parameter determining Pcmax may vary according to unicast, groupcast, and broadcast communication modes.

Furthermore, as another example of a case in which the UE needs to stop an accumulation operation, when a transmission power value calculated and set by the UE reaches a specific threshold value, and a TPC command received from the BS indicates a negative value, the UE may stop the accumulation operation.

For example, when it is assumed that a previously stored UE transmission power value for a CLPC process and its threshold value are respectively P0 and P2 and that the UE has received a TPC command from the BS to decrease its transmission power value by 3 dB (i.e., −3 dB), a case in which $P_0-3$ dB<P2 may occur, and in this case, the UE may stop an accumulation operation (i.e., a transmission power value for the CLPC process is set using the previously stored UE transmission power value P0 without accumulation).

In this case, the threshold value P2 may be a minimum UE output power Pcmin that may vary according to a V2X communication mode. In other words, a value of Pcmin may vary according to unicast, groupcast, and broadcast communication modes. Alternatively, the same Pcmin may be used regardless of a communication mode, but a value of parameter determining Pcmin may vary according to unicast, groupcast, and broadcast communication modes.

When the UE Needs to Reset a CLPC Process

Alt1: A CLPC Process is Reset According to a Command from a BS

A V2X UE may reset a CLPC process according to a command from the BS. As described above, an index of the CLPC process may be correlated to a V2X resource pool or OLPC parameters (i.e., $P_0$ and $\alpha$). In a case where the V2X resource pool is correlated to the index of the CLPC process, the UE may reset the CLPC process when the BS changes a RRC configuration for the V2X resource pool. Furthermore, when a value of at least one of the OLPC parameters configured by the BS is changed, the UE may reset the CLPC process. In more detail, $P_0$ may be a parameter for controlling a target reception power at a RX side and may be composed of a sum of a UE-specific value $P_{0\_UE\text{-}specific}$ and a UE-common value $P_{0\_UE\text{-}common}$ (i.e., $P_0(j)=P_{0\_UE\text{-}specific}(j)+P_{0\_UE\text{-}common}(j)$). In this case, when the UE-specific value $P_{0\_UE\text{-}specific}$ is changed by RRC, the UE may reset the CLPC process.

In the above examples, when the CLPC process is reset, the CLPC process may be restarted, and at this time, an initial value for the CLPC process may be set to 0.

Alt2: A CLPC Process May be Reset According to a Command from a V2X TX or RX UE.

A V2X UE may receive a command indicating resetting of the CLPC process from another V2X UE. For example, a V2X TX UE (or a V2X RX UE) or a UE for transmitting a V2X synchronization signal may implicitly or explicitly transmit information about whether to reset the CLPC process through a SL broadcast channel or a SL control channel. In the case of implicit transmission, specifically, at least one of the OLPC parameters (one or both of $P_0$ and $\alpha$) for SL TPC may be transmitted through a SL broadcast channel or SL control channel. When values of these parameters are changed, V2X UEs that have received the changed parameters may reset a CLPC process. As another example of implicit transmission, when a V2X transmission or reception resource (or a V2X transmission or reception resource pool) is correlated to a CLPC process, parameters for V2X resource configuration may be changed via a SL broadcast channel or SL control channel. The V2X UE that has received the changed parameters may reset the CLPC process. At this time, the parameters for V2X resource configuration may include at least one of a time/frequency location of a resource (or resource pool) for V2X transmission/reception, a bandwidth or an index of a sequence for V2X transmission/reception, or a time/frequency location at which the sequence is transmitted. As another example of implicit transmission, when a V2X communication mode is changed, a V2X UE may reset a CLPC process. In other words, when a V2X TX or RX UE that has performed unicast communication performs groupcast or broadcast communication, the V2X TX or RX UE may reset the CLPC process. On the other hand, in the case of explicit signaling, when a V2X UE receives a command indicating a change of an index of a CLPC process from the BS or another V2X UE (i.e., when the V2X UE receives a request for a change of an index of a CLPC process that it has managed), the V2X UE that has received the request may reset the CLPC process.

In the above-described examples, when the CLPC process is reset, the CLPC process is restarted, and at this time, an initial value for the CLPC process may be set to 0.

Figure 8:
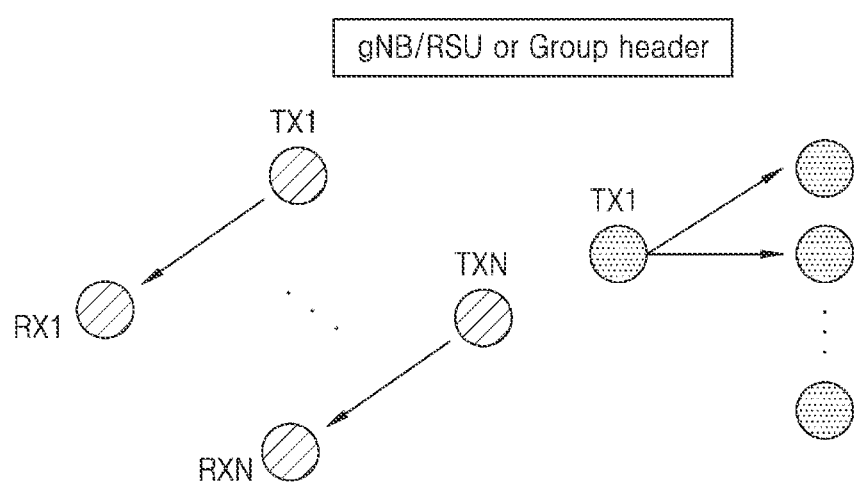
FIG. 8 shows an example in which various V2X communication modes simultaneously operate within coverage of a base station, according to some embodiments of the present disclosure.

FIG. 8 shows an example in which various V2X communication modes simultaneously operate within coverage of a BS, according to some embodiments of the present disclosure.

FIG. 8 illustrates N unicast communication links and (N≥1) and one groupcast communication link, but is not limited thereto. In other words, only two or more unicast communication links or two or more groupcast communication links may exist in one BS. Furthermore, in FIG. 8, the BS may be a BS capable of supporting both V2X functions and general cellular communication, an RSU capable of supporting only the V2X functions, or a group header serving as a group leader in group communication.

In an environment where two or one unicast links exist, when the BS transmits a TPC command to each V2X TX UE (or V2X RX UE) performing unicast communication via V2X-specific DCI, extremely large signaling overhead may be introduced.

In addition, in an environment where two or more groupcast links exist, when the BS transmit a TPC command to each V2X TX UE (or two or more V2X RX UEs) performing groupcast communication via corresponding V2X DCI, extremely large signaling overhead may be introduced. This signaling overhead may be obviously increased even in an environment where two or more unicast links and two or more groupcast links exist. Thus, in order to reduce DCI overhead for a TPC command, it may be necessary to use group-common DCI.

Furthermore, a case in which a group header transmits a TPC command for a V2X TX or RX UE existing in its own group may be taken into consideration. In this case, the TPC command may be transmitted via SCI instead of DCI, and similarly to the above, a group-common SCI needs to be used to reduce SCI overhead.

In this case, two or more group-common DCIs or two or more group-common SCIs may be used.

[Methods of Using Two or More Group-Common DCIs/SCIs]

Use According to Type of SL Channel/Signal

According to some embodiments, group-common DCIs (or group-common SCIs) having different formats may be used according to a type of a SL channel or a signal transmitted via SL (e.g., a CSI-RS, a SRS, a DMRS, or a separate RS for SL measurement). In detail, a SL control channel and a SL data channel may use group-common DCIs (or group-common SCIs) having different formats. The group-common DCIs (or group-common SCIs) respectively applied to the SL control channel and SL data channel may use different RNTIs. Thereby, the UE that has received a group-common DCI (or a group-common SCI) may obtain corresponding information. Furthermore, according to some embodiments, SL physical channels (i.e., a SL control channel and a SL data channel) may use group-common DCI (or group-common SCI) having the same format, and a signal transmitted via SL (e.g., a CSI-RS, a SRS, a DMRS, or a separate RS for SL measurement) may use a DCI format different than the format used for the SL physical channels. A group-common DCI (or group-common SCI) used for transmitting a TPC command fora measured signal via SL may include an additional command indicating transmission of the measured signal, as well as the TPC command.

Use According to V2X Communication Mode

Group-common DCIs (or group-common SCIs) having different formats may be used according to unicast, groupcast, and broadcast communication modes. The UE may decode group-common DCI having a format that it expects to receive by using a RNTI value used to scramble each format of group-common DCI (group-common SCI) or mask cyclic redundancy check (CRC).

Use According to V2X TX and RX UEs

A SL TX UE and a SL RX UE may receive group-common DCIs (or group-common SCIs) having different formats. For example, the SL TX UE may receive group-common DCI format X1 from the BS while the SL RX UE may receive group-common DCI format X2 therefrom. Furthermore, the SL TX UE may receive group-common SCI format Y1 from a group header, and the SL RX UE may receive group-common SCI format Y2 therefrom.

By using SL closed loop transmission power control according to embodiments of the present disclosure, the reliability of transmission and reception of control information and data information in a vehicle communication system may be improved, and the amount of interference caused to neighboring cells or vehicles may be reduced. Accordingly, more efficient communication between UEs may be supported.

Figure 9:
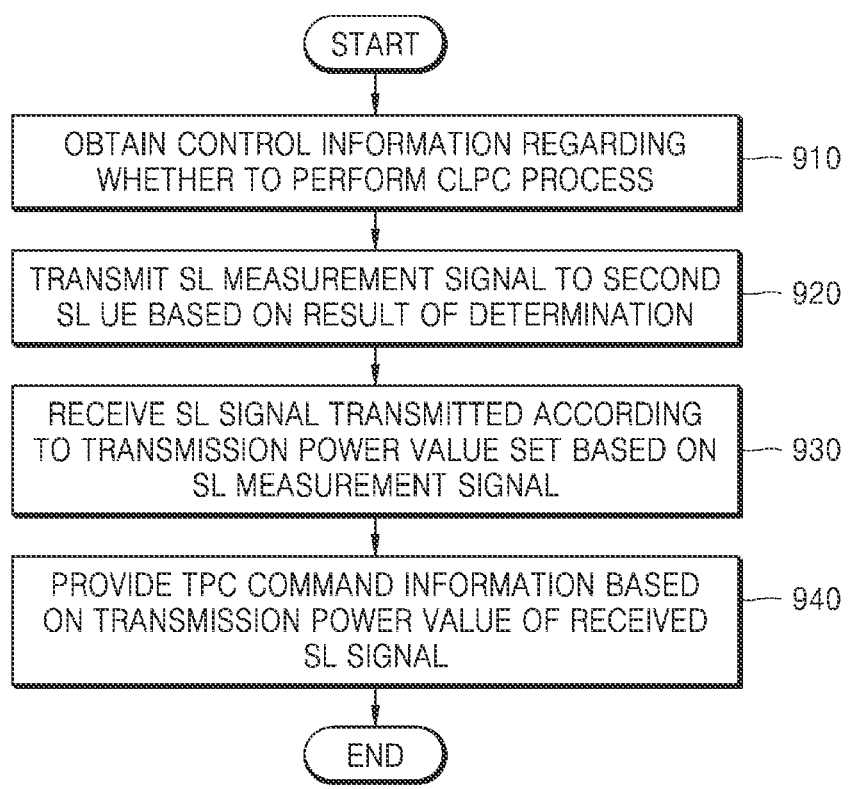
FIG. 9 is a flowchart of a method, performed by a first sidelink UE, of controlling a transmission power, according to some embodiments of the present disclosure.

FIG. 9 is a flowchart of a method, performed by a first SL UE, of controlling a transmission power, according to some embodiments of the present disclosure.

In operation 910, the first SL UE may obtain control information for determining whether to perform a CLPC process. According to some embodiments, a SL UE may include a V2X UE or a D2D UE.

According to some embodiments, whether to perform the CLPC process may be determined according to a type of communication between the first SL UE and a second SL UE. In other words, whether to perform the CLPC process may be determined according to whether a type of communication between the first and second SL UEs is unicast, groupcast, or broadcast communication. Whether to perform the CLPC process may be determined based on a configuration of at least one of the first SL UE, the second SL UE, or a BS.

Furthermore, according to some embodiments, whether to perform the CLPC process may be determined based on whether at least one of the first or second SL UE is located within coverage of the BS.

According to some embodiments, a type of communication between the first and second SL UEs may be determined based on a transmission/reception resource pool allocated to at least one of the first or second SL UE or an OLPC parameter. In other words, the first or second SL UE may determine a type of communication between the first and second SL UEs according to which type of transmission/reception resource pool is allocated thereto or based on which OLPC parameter is obtained.

Furthermore, according to some embodiments, the type of communication between the first and second SL UEs may be determined based on at least one of DCI or RRC signaling received from the BS. Furthermore, according to some embodiments, when neither the first nor the second SL UE is located within the coverage of the BS, the CLPC may not be performed.

In addition, according to some embodiments, control information for determining whether to perform CLPC may be obtained via RRC signaling or DCI received from the BS. In other words, the first or second SL UE may receive the control information for determining whether to perform the CLPC directly from the BS via RRC signaling or DCI.

According to some embodiments, control information for determining whether to perform CLPC may be obtained based on at least one of a bit field for a TPC command in DCI received from the BS, an indicator field indicating whether to perform CLPC in the DCI, or an OLPC parameter included in the DCI Furthermore, according to some embodiments, when one of the first and second SL UEs is located outside the coverage of the BS, the other of the first and second SL UEs, which is located within the coverage of the BS, may transmit control information for determining whether to perform CLPC to the one SL UE located outside the coverage of the BS.

In addition, according to some embodiments, when the first and second SL UEs are both located outside the coverage of the BS, one of the first and second SL UEs may transmit control information for determining whether to perform CLPC to the other SL UE.

According to some embodiments, control information for determining whether to perform CLPC may be provided via SL MIB transmitted over a PSBCH, SCI transmitted over a PSCCH, or data or control information transmitted over a PSSCH.

In operation 920, the first SL UE may transmit a SL measurement signal to a second SL UE based on a result of determination.

According to some embodiments, the first SL UE may not directly transmit the SL measurement signal to the second SL UE but request the second SL UE to transmit the SL measurement signal. Because this operation corresponds to that described above, a detailed description thereof will be omitted.

In operation 930, the first SL UE may receive a SL signal transmitted according to a transmission power value set based on the SL measurement signal.

According to some embodiments, the second SL UE may determine path loss information based on the SL measurement signal and determine a transmission power value according to a result of the determination. The second SL UE may transmit a SL signal based on the determined transmission power value. According to some embodiments, the SL signal may include at least one of a SL control signal or a SL data signal.

Furthermore, according to some embodiments, the first SL UE may request the second SL UE to transmit a SL measurement signal, receive the requested SL measurement signal, and then provide measured path loss information to the second SL UE.

In addition, according to some embodiments, because a transmission power value of the SL signal received by the first SL UE in operation 930 is a value obtained before transmission of TPC command information, it may be a transmission power value to which the TPC command information has not been applied. For example, before receiving the TPC command information, the second SL UE may set a TPC value to 0 and determine a transmission power value.

In operation 940, the first SL UE may provide TPC command information based on a transmission power value of the received SL signal.

According to some embodiments, the first SL UE may select an accumulative or absolute TPC mode based on at least one of a type of communication between the first and second SL UEs or a type of channels between the first and second SL UEs and then provide TPC command information corresponding to the selected TPC mode.

Furthermore, the first SL UE may select an accumulative or absolute TPC mode based on at least one of RRC signaling or SIB received from the BS or a field indicating a TPC mode or a field indicating a TPC command, which is included in a PSBCH or PSCCH obtained from the second SL UE, and then provide TPC command information corresponding to the selected TPC mode.

According to some embodiments, when the selected TPC mode is an accumulative TPC mode, a reference threshold value for stopping accumulation of transmission power values may be determined according to a type of communication between the first and second SL UEs. In other words, when using the accumulative TPC mode, the second SL UE stops accumulation of transmission power based on a threshold value, which may be a maximum or minimum transmission power for the second SL UE or a predetermined value, and the predetermined value may be determined by a type of communication between the first and second SL UEs.

Furthermore, according to some embodiments, when the selected TPC mode is an accumulative TPC mode, an accumulated transmission power value may be reset when a type of communication between the first and second SL UEs is changed, an OLPC parameter is changed, a configuration for a transmission/reception resource pool is changed, or a CLPC index is changed. In other words, when in the accumulative TPC mode, the second SL UE may reset the accumulated transmission power value when a communication mode is changed or a configuration for a parameter, a resource pool, a CLPC index, or the like is changed.

According to some embodiments, the first SL UE may provide the TPC command information to the second SL UE directly or through the BS or a group head.

Furthermore, according to some embodiments, the BS or group head may provide the TPC command information via group-common SCI or group-common DCI. A format of the group-common SCI or group-common DCI may be determined based on at least one of a type of a SL channel, a type of a signal transmitted via SL, a type of communication between the first SL UE and at least one second SL UE, or a type of a SL UE provided with the group-common SCI or group-common DCI.

In other words, in order to reduce overhead, the BS or group head may provide the TPC information via the group-common DCI or SCI by taking into account at least one of the above-described information such as a type of communication between SL UEs or a channel type.

Furthermore, as described above, a plurality of CLPC processes may be performed. For example, the first SL UE may perform a first CLPC process with the second SL UE while performing a second CLPC process with a third SL UE. The first CLPC process may be performed independently of the second CLPC process.

According to some embodiments, the first CLPC process may be distinguished from the second CLPC process by a CLPC index. Furthermore, the CLPC index may be determined based on one of a type of communication between the first SL UE and at least one SL UE and a type of a SL channel.

Furthermore, the CLPC index may be determined based on an allocated transmission/reception resource pool and OLPC parameters, and based on at least one of RRC signaling or DCI received from the BS or SCI transmitted and received between the first SL UE and at least one SL UE.

In other words, when a plurality of CLPC processes exist, each CLPC process may be performed independently of the others, and which CLPC process is to be applied to communication between SL devices may be determined based on the above-described various pieces of information.

In addition, according to some embodiments, the first SL UE may request the second SL UE to transmit a SL measurement signal, receive the requested SL measurement signal, and then provide measured path loss information to the second SL UE. The second SL UE may then receive the measured path loss information from the first SL UE, determine a transmission power value based on the received information, and transmit a SL signal. The first SL UE may transmit TPC command information to the second SL UE based on the SL signal received from the second SL UE.

Figure 10:
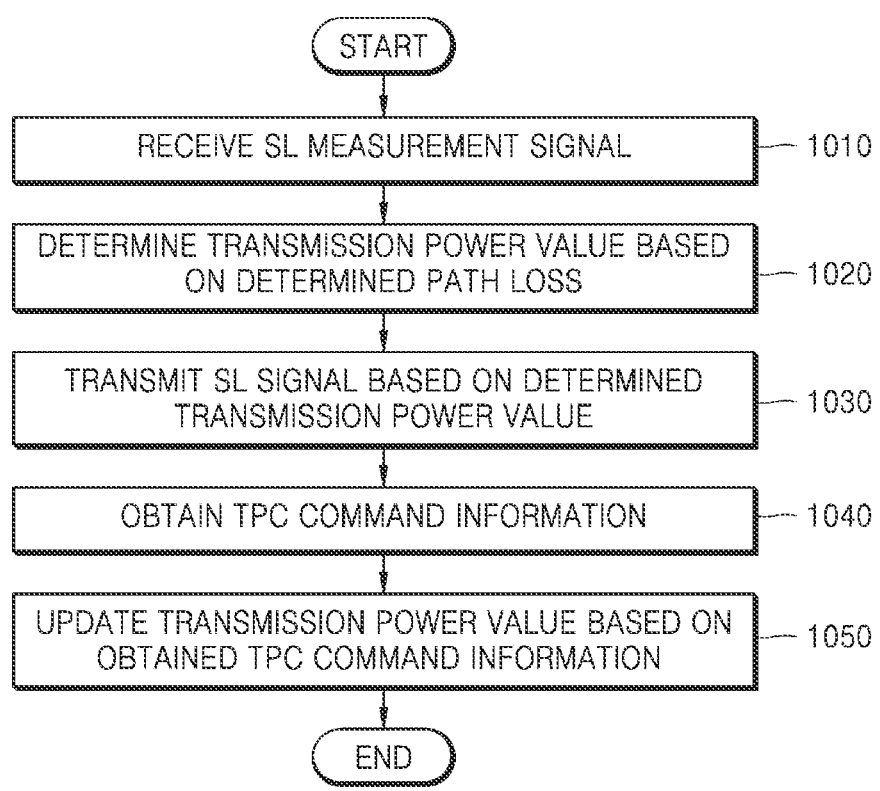
FIG. 10 is a flowchart of a method, performed by a second sidelink UE, of controlling a transmission power, according to some embodiments of the present disclosure.

FIG. 10 is a flowchart of a method, performed by a second SL UE, of controlling a transmission power, according to some embodiments of the present disclosure.

In operation 1010, the second SL UE may receive a SL measurement signal. In other words, the second SL UE may receive the SL measurement signal from a first SL UE based on control information for determining whether to perform CLPC.

According to some embodiments, control information for determining whether to perform CLPC may be obtained from at least one of a BS, a first SL UE, or a group head. Because this operation corresponds to that described above, a detailed description thereof will be omitted.

According to some embodiments, whether to perform the CLPC may be determined based on a type of communication between the first and second SL UEs. Furthermore, according to some embodiments, whether to perform the CLPC may be determined based on whether at least one of the first or second SL UE is located within coverage of a BS. In addition, whether to perform the CLPC may be determined based on other types of information described above.

According to some embodiments, a type of communication between the first and second SL UEs may be determined based on at least one of a transmission/reception resource pool allocated to at least one of the first or second SL UE, an OLPC parameter, DCI, or RRC signaling, the DCI and RRC signaling being received from the BS. Because criteria for determining the type of communication between the first and second SL UEs correspond to those described above, detailed descriptions thereof will be omitted.

In operation 1020, the second SL UE may determine a transmission power value based on determined path loss information.

According to some embodiments, the transmission power value to be used for transmitting a SL signal, which is determined in operation 1020, may be a transmission power value to which a TPC value has not been applied. In other words, before receiving TPC command information, the second SL UE may set a TPC value to 0 and determine a transmission power value.

In operation 1030, the second SL UE may transmit a SL signal based on the determined transmission power value.

According to some embodiments, the SL signal may include at least one of a SL control signal or a SL data signal.

As described above, because the transmission power value determined in operation 1020 is a value obtained before TPC command information is obtained, it may be a transmission power value to which the TPC command information has not been applied. For example, the second SL UE may set, to 0, a TPC value before the TPC command information is obtained and may not apply the TPC value when determining a transmission power before receiving the TPC command information.

In operation 1040, the second SL UE may obtain TPC command information.

According to some embodiments, the first SL UE may receive the SL signal transmitted by the second SL UE in operation 1030 and transmit, to the second SL UE, the TPC command information for controlling a transmission power at the second SL UE. The second SL UE may then receive the TPC command information transmitted by the first SL UE.

According to some embodiments, the second SL UE may receive the TPC command information directly from the first SL UE or from the BS or a group head.

In operation 1050, the second SL UE may update a transmission power value based on the obtained TPC command information.

According to some embodiments, the second SL UE may determine whether the TPC command information is command information in an accumulative TPC mode or command information in an absolute TPC mode.

When the TPC command information is command information in the accumulative TPC mode, the second SL UE may stop accumulating a transmission power value based on a threshold value determined based on a type of communication between the first and second SL UEs.

Furthermore, the first SL UE may be a SL TX or RX UE. In other words, the above-described operations are not limited to the above example, and SL TX and RX UEs may each perform some of these operations, or either the SL TX or RX UE may perform all the operations.

Figure 11:
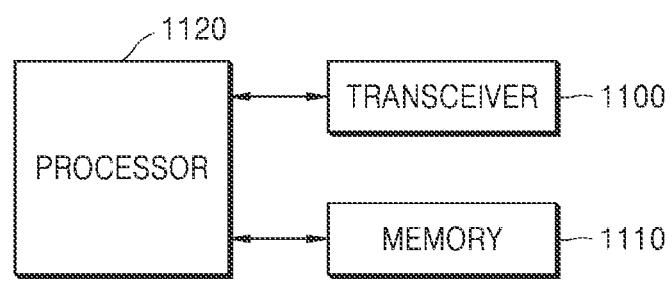
FIG. 11 illustrates a detailed structure of a UE according to some embodiments of the present disclosure.
Figure 12:
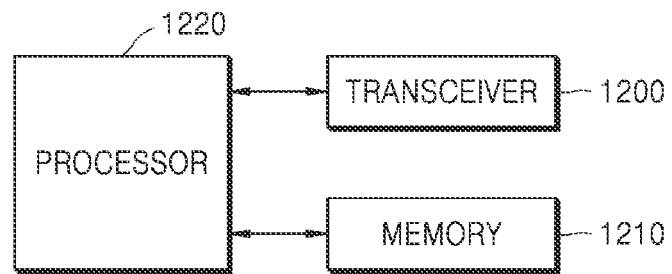
FIG. 12 illustrates a detailed structure of a base station according to some embodiments of the present disclosure.

In order to perform the operations according to the above embodiments of the present disclosure, a UE and a BS may each include a transceiver, a memory, and a processor as shown in FIGS. 11 and 12. The BS and the UE may transmit and receive information in order to apply the method of controlling a transmission power in a wireless communication system, and a transceiver, a memory, and a processor of the BS or UE need to operate according to an embodiment in order to perform the method of controlling a transmission power in the wireless communication system.

FIG. 11 illustrates a detailed structure of a UE according to some embodiments of the present disclosure.

Referring to FIG. 11, the UE of the present disclosure may include a processor 1101, a transceiver 1102 and a memory 1103. However, the components of the UE are not limited thereto. For example, the UE may include more or fewer components than those described above. Furthermore, the processor 1101, the transceiver 1102, and the memory 1103 may be implemented as a single chip.

According to some embodiments, the processor 1101 may control a series of processes such that the UE may operate according to the above embodiment of the present disclosure. For example, the processor 1101 may control the components of the UE to perform a method of controlling a transmission power for a SL UE according to an embodiment of the present disclosure. The processor 1101 may include a plurality of processors and execute a program stored in the memory 1103 to perform the above-described transmission power control operation according to the present disclosure.

The transceiver 1102 may transmit or receive signals to or from a BS. Here, the signals may include control information and data. The transceiver 1102 may include a radio frequency (RF) transmitter for up-converting and amplifying a frequency of a signal to be transmitted and an RF receiver for low-noise amplifying a received signal and down-converting its frequency. However, this is merely an example of the transceiver 1102, and components of the transceiver 1102 are not limited to the RF transmitter and the RF receiver. Furthermore, the transceiver 1102 may receive a signal via a radio channel and output the signal to the processor 1101 and transmit a signal output from the processor 1101 via a radio channel.

According to some embodiments, the memory 1103 may store data and programs necessary for operations of the UE. Furthermore, the memory 1103 may store control information or data in a signal transmitted or received by the UE. The memory 1103 may include storage media such as read-only memory (ROM), random access memory (RAM), hard discs, compact disc (CD)-ROM, and digital video discs (DVDs), or a combination thereof. The memory 1103 may include a plurality of memories. According to some embodiments, the memory 1103 may store a program for performing an operation of controlling a transmission power in SL communication according to the embodiments of the present disclosure.

FIG. 12 illustrates a detailed structure of a BS according to some embodiments of the present disclosure.

Referring to FIG. 12, the BS of the present disclosure may include a processor 1201, a transceiver 1202 and a memory 1203. However, the components of the BS are not limited thereto. For example, the BS may include more or fewer components than those described above. Furthermore, the processor 1201, the transceiver 1202, and the memory 1203 may be implemented as a single chip.

The processor 1201 may control a series of processes such that the BS may operate according to the embodiment of the present disclosure. For example, the processor 1201 may control the components of the BS to perform a method of controlling a transmission power in a wireless communication system according to an embodiment of the present disclosure.

For example, the processor 1201 may control the transceiver 1202 to provide control information for determining whether to perform CLPC to a SL UE. Furthermore, the processor 1201 may control the transceiver 1202 to provide TPC command information.

The transceiver 1202 may transmit or receive signals to or from a UE. Here, the signals may include control information and data. The transceiver 1202 may include an RF transmitter for up-converting and amplifying a frequency of a signal to be transmitted and an RF receiver for low-noise amplifying a received signal and down-converting its frequency. However, this is merely an example of the transceiver 1202, and components of the transceiver 1202 are not limited to the RF transmitter and the RF receiver. Furthermore, the transceiver 1202 may receive a signal via a radio channel and output the signal to the processor 1201 and transmit a signal output from the processor 1201 via a radio channel. The processor 1201 may include a plurality of processors and execute a program stored in the memory 1203 to perform the method of controlling a transmission power in a wireless communication system according to the present disclosure.

According to some embodiments, the memory 1203 may store data and programs necessary for operations of the BS. Furthermore, the memory 1203 may store control information or data in a signal transmitted or received by the BS. The memory 1203 may include storage media such as ROM, RAM, hard discs, CD-ROM, and DVDs, or a combination thereof. Furthermore, the memory 1203 may include a plurality of memories. According to some embodiments, the memory 1203 may store a program for performing the method of controlling a transmission power in a wireless communication system, according to the embodiments of the present disclosure. The methods according to the embodiments of the present disclosure described in the appended claims or specification thereof may be implemented in hardware, software, or a combination of hardware and software.

When the methods are implemented in software, a computer-readable storage medium storing one or more programs (software modules) may be provided. The one or more programs stored in the computer-readable storage medium are configured for execution by one or more processors within an electronic device. The one or more programs include instructions that cause the electronic device to execute the methods according to the embodiments of the present disclosure described in the claims or specification thereof.

These programs (software modules or software) may be stored in RAM, non-volatile memory including a flash memory, ROM, electrically erasable programmable ROM (EEPROM), a magnetic disc storage device, CD-ROM, DVDs or other types of optical storage devices, and a magnetic cassette. Alternatively, the programs may be stored in a memory that is configured as a combination of some or all of the memories. Furthermore, a plurality of such memories may be included.

Furthermore, the programs may be stored in an attachable storage device that may be accessed through communication networks such as the Internet, Intranet, a local area network (LAN), a wide LAN (WLAN), and a storage area network (SAN) or a communication network configured in a combination thereof. The storage device may access a device for performing methods according to the embodiments of the present disclosure via an external port. Furthermore, a separate storage device on a communication network may also access a device for performing the methods according to the embodiments of the present disclosure.

In specific embodiments of the present disclosure, a component included in the present disclosure is expressed in a singular or plural form depending on the specific embodiments. However, singular or plural expressions are selected to be suitable for situations presented for convenience of description, and the present disclosure is not limited to the singular or plural form. An element expressed in a plural form may be configured as a single element, or an element expressed in a singular form may be configured as a plurality of elements.

The embodiments of the present disclosure disclosed in the present specification and the accompanying drawings have been provided only as specific examples in order to easily describe technical features in the present disclosure and assist in understanding the present disclosure and are not intended to limit the scope of the present disclosure. In other words, it is obvious to those of ordinary skill in the art that other modifications may be implementable based on the technical spirit of the disclosure. Furthermore, the embodiments of the present disclosure may be combined with each other for operation when necessary. For example, an embodiment of the present disclosure may be combined with parts of other embodiments of the disclosure to operate a BS and a UE. Furthermore, embodiments of the present disclosure may be applicable to other communication systems, and other modifications based on the technical spirit of the embodiments may also be implementable.

The invention claimed is:

1. A method, performed by a sidelink user equipment (UE), of controlling a transmission power in a wireless communication system, the method comprising:
obtaining, by a first sidelink UE, control information for determining whether to perform a closed loop power control (CLPC) process;
transmitting a sidelink measurement signal to a second sidelink UE, based on a result of the determining;
receiving a sidelink signal transmitted according to a transmission power value set based on the sidelink measurement signal; and
providing transmission power control (TPC) command information based on a transmission power value of the received sidelink signal.

2. The method of claim 1, wherein whether to perform the CLPC process is determined based on at least one of a type of communication between the first and second sidelink UEs or whether at least one of the first or second sidelink UE is located within coverage of a base station.

3. The method of claim 2, wherein the type of communication between the first and second sidelink UEs is determined based on at least one of transmission and reception resource pools allocated to at least one of the first or second sidelink UE, an open loop power control (OLPC) parameter, downlink control information (DCI), or radio resource control (RRC) signaling, the DCI and the RRC signaling being received from the base station.

4. The method of claim 2, wherein the control information for determining whether to perform the CLPC process is configured such that the CLPC process is not performed when neither the first nor the second SL UE is located within the coverage of the base station.

5. The method of claim 1, wherein the obtaining of the control information for determining whether to perform the CLPC process comprises obtaining the control information via radio resource control (RRC) signaling or downlink control information (DCI) received from a base station.

6. The method of claim 5, wherein the obtaining of the control information for determining whether to perform the CLPC process comprises obtaining the control information for determining whether to perform the CLPC process based on a bit field for a TPC command in the DCI received from the base station, an indicator field indicating whether to perform the CLPC process in the DCI, and an OLPC parameter included in the DCI.

7. The method of claim 1, wherein the obtaining of the control information for determining whether to perform the CLPC process comprises obtaining the control information for determining whether to perform the CLPC process via at least one of a sidelink master information block (MIB) or sidelink control information (SCI) transmitted by the second sidelink UE.

8. The method of claim 1, wherein the providing of the TPC command information comprises selecting an accumulative TPC mode or an absolute TPC mode based on at least one of a type of communication between the first and second sidelink UEs, a type of channels between the first and second sidelink UEs, radio resource control (RRC) signaling or a system information block (SIB) received from a base station, or a field indicating a TPC mode or a field indicating a TPC command, which is included in a physical sidelink broadcast channel (PSBCH) or physical sidelink control channel (PSCCH) obtained from the second sidelink UE, and providing the TPC command information corresponding to the selected TPC mode.

9. The method of claim 8, wherein, when the selected TPC mode is the accumulative TPC mode, a reference threshold value for stopping accumulation of transmission power values is determined according to the type of communication between the first and second sidelink UEs.

10. The method of claim 8, wherein, when the selected TPC mode is an accumulative TPC mode, an accumulated transmission power value is reset when the type of communication between the first and second sidelink UEs is changed, when an open loop power control (OLPC) parameter is changed, when a configuration for transmission and reception resource pools is changed, or when a CLPC index is changed.

11. The method of claim 1, wherein the providing of the TPC command information comprises providing the TPC command information to at least one second sidelink UE via a base station or group head, wherein the TPC command information is included in group-common sidelink control information (SCI) or group-common downlink control information (DCI).

12. The method of claim 11, wherein a format of the group-common SCI or group-common DCI is determined based on at least one of a type of a sidelink channel, a type of a signal transmitted via sidelink, a type of communication between the first sidelink UE and the at least one second sidelink UE, or a type of a sidelink UE provided with the group-common SCI or group-common DCI.

13. A method, performed by a sidelink user equipment (UE), of controlling a transmission power in a wireless communication system, the method comprising:
- receiving, by a second sidelink UE, a sidelink measurement signal from a first sidelink UE based on control information for determining whether to perform closed loop power control (CLPC);
- determining a transmission power value based on a path loss determined based on the sidelink measurement signal;
- transmitting a sidelink signal based on the determined transmission power value;
- obtaining transmission power control (TPC) command information; and
- updating a transmission power value based on the obtained TPC command information.

14. A first sidelink user equipment (UE) for controlling a transmission power for a UE in a wireless communication system, the first sidelink UE comprising:
- a transceiver configured to transmit or receive a signal to or from a base station or a second sidelink UE;
- a memory storing data and a program for controlling the transmission power; and
- a processor configured to execute the program stored in the memory to control the first sidelink UE to obtain control information for determining whether to perform a closed loop power control (CLPC) process, transmit a sidelink measurement signal to a second sidelink UE based on a result of the determining, receive a sidelink signal transmitted according to a transmission power value set based on the sidelink measurement signal, and provide transmission power control (TPC) command information based on a transmission power value of the received sidelink signal.

15. A second sidelink user equipment (UE) for controlling a transmission power for a UE in a wireless communication system, the second sidelink UE comprising:
- a transceiver configured to transmit or receive a signal to or from a base station or a first sidelink UE;
- a memory storing data and a program for controlling the transmission power; and
- a processor configured to execute the program stored in the memory to control the second sidelink UE to receive a sidelink measurement signal from a first sidelink UE based on control information for determining whether to perform closed loop power control (CLPC), determine a transmission power value based on a path loss determined based on the sidelink measurement signal, transmit a sidelink signal based on the determined transmission power value, obtain transmission power control (TPC) command information, and update a transmission power value based on the obtained TPC command information.

\* \* \* \* \*